US012469455B2

(12) United States Patent
Park et al.

(10) Patent No.: US 12,469,455 B2
(45) Date of Patent: Nov. 11, 2025

(54) DISPLAY DEVICE

(71) Applicant: SAMSUNG DISPLAY CO., LTD., Yongin-si (KR)

(72) Inventors: Sehyuk Park, Yongin-si (KR); Hongsoo Kim, Yongin-si (KR); Jin-Wook Yang, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/922,578

(22) Filed: Oct. 22, 2024

(65) Prior Publication Data

US 2025/0131881 A1 Apr. 24, 2025

(30) Foreign Application Priority Data

Oct. 23, 2023 (KR) ........................ 10-2023-0142317

(51) Int. Cl.
*G09G 3/3233* (2016.01)
*G09G 3/20* (2006.01)

(52) U.S. Cl.
CPC ......... *G09G 3/3233* (2013.01); *G09G 3/2003* (2013.01); *G09G 2300/0426* (2013.01); *G09G 2300/0452* (2013.01); *G09G 2310/0297* (2013.01); *G09G 2310/08* (2013.01); *G09G 2330/021* (2013.01)

(58) Field of Classification Search
CPC ............... G09G 3/3233; G09G 3/2003; G09G 2300/0426; G09G 2300/0452; G09G 2310/0297; G09G 2310/08; G09G 2330/021
See application file for complete search history.

(56) References Cited

U.S. PATENT DOCUMENTS

| | | | | |
|---|---|---|---|---|
| 8,605,018 B2 * | 12/2013 | Lee | G09G 3/3688 345/212 |
| 9,870,749 B2 | 1/2018 | Yoo et al. | |
| 10,115,351 B2 * | 10/2018 | Kim | G09G 3/3291 |
| 10,410,578 B2 * | 9/2019 | Song | G09G 3/3233 |
| 10,650,748 B2 | 5/2020 | Kim et al. | |
| 10,672,343 B2 * | 6/2020 | Sun | G09G 3/3266 |
| 10,679,551 B2 * | 6/2020 | Yang | G09G 3/3291 |
| 10,685,605 B2 * | 6/2020 | Na | G09G 3/3225 |

(Continued)

FOREIGN PATENT DOCUMENTS

| | | |
|---|---|---|
| KR | 10-2219667 | 2/2021 |
| KR | 10-2356992 | 2/2022 |

(Continued)

*Primary Examiner* — Michael J Jansen, II
(74) *Attorney, Agent, or Firm* — F. CHAU & ASSOCIATES, LLC

(57) ABSTRACT

A display device includes a plurality of data lines, a plurality of first gate lines, a plurality of second gate lines, and a plurality of pixels. The plurality of pixels includes a first group of pixels and a second group of pixels. The plurality of data lines includes a first group of data lines connected to the first group of pixels and a second group of data lines connected to the second group of pixels. A data signal is provided to the first group of pixels in a first sub-frame period of one frame period. A data signal is provided to the second group pixels in a second sub-frame period of the one frame period that is adjacent to the first sub-frame period.

19 Claims, 19 Drawing Sheets

(56) References Cited

U.S. PATENT DOCUMENTS

| | | | | |
|---|---|---|---|---|
| 10,726,789 | B2 | 7/2020 | Cho et al. | |
| 10,872,562 | B2 * | 12/2020 | Na | G09G 3/3233 |
| 10,957,231 | B2 * | 3/2021 | Kang | G09G 3/20 |
| 11,017,728 | B2 * | 5/2021 | Choe | G09G 3/3291 |
| 11,423,821 | B2 * | 8/2022 | Oh | G09G 3/3291 |
| 11,551,601 | B2 * | 1/2023 | Ahn | G09G 5/10 |
| 11,715,406 | B2 * | 8/2023 | Park | G09G 3/3283 345/690 |
| 11,908,399 | B2 * | 2/2024 | Choi | G09G 3/20 |
| 11,935,453 | B2 * | 3/2024 | Park | G09G 3/2003 |
| 12,094,422 | B2 * | 9/2024 | Seo | G09G 3/3266 |
| 2011/0175858 | A1 * | 7/2011 | Lee | G09G 3/3688 345/204 |
| 2015/0161927 | A1 * | 6/2015 | Hekstra | G09G 3/3614 345/209 |
| 2016/0019842 | A1 * | 1/2016 | Kim | G09G 3/3291 345/694 |
| 2016/0093260 | A1 * | 3/2016 | Watsuda | G09G 3/3611 345/87 |
| 2016/0217744 | A1 * | 7/2016 | Song | G09G 3/3233 |
| 2019/0043421 | A1 * | 2/2019 | Yang | G09G 3/3291 |
| 2019/0189059 | A1 * | 6/2019 | Na | G09G 3/3225 |
| 2019/0244569 | A1 * | 8/2019 | Sun | G09G 3/3266 |
| 2019/0259331 | A1 * | 8/2019 | Na | G09G 3/3233 |
| 2020/0074908 | A1 * | 3/2020 | Kang | G09G 3/20 |
| 2020/0105204 | A1 * | 4/2020 | Choe | G09G 3/3258 |
| 2021/0366343 | A1 * | 11/2021 | Oh | G09G 3/2003 |
| 2021/0398473 | A1 * | 12/2021 | Ahn | G09G 5/10 |
| 2022/0366828 | A1 * | 11/2022 | Park | G09G 3/2003 |
| 2023/0018362 | A1 * | 1/2023 | Park | G09G 3/3241 |
| 2023/0122018 | A1 * | 4/2023 | Choi | G09G 3/3208 345/690 |
| 2023/0290313 | A1 * | 9/2023 | Seo | G09G 3/3233 |
| 2024/0404478 | A1 * | 12/2024 | Seo | G09G 3/3266 |

FOREIGN PATENT DOCUMENTS

| | | |
|---|---|---|
| KR | 10-2022-0156147 | 11/2022 |
| KR | 10-2023-0013676 | 1/2023 |
| KR | 10-2497286 | 2/2023 |
| KR | 10-2502762 | 2/2023 |

* cited by examiner

FIG. 10

| Pattern | Channel | HFR1 | HFR2 |
|---|---|---|---|
| White | Odd | R B R B ··· R B R B | G G G G ··· G G G G |
| | Even | B R B R ··· B R B R | G G G G ··· G G G G |
| Red | Odd | R B R B ··· R B R B | G G G G ··· G G G G |
| | Even | B R B R ··· B R B R | G G G G ··· G G G G |
| Green | Odd | R B R B ··· R B R B | G G G G ··· G G G G |
| | Even | B R B R ··· B R B R | G G G G ··· G G G G |
| Blue | Odd | R B R B ··· R B R B | G G G G ··· G G G G |
| | Even | B R B R ··· B R B R | G G G G ··· G G G G |

DISPLAY DEVICE

CROSS-REFERENCE TO RELATED APPLICATIONS

This patent application claims priority under 35 U.S.C. § 119 to Korean Patent Application No. 10-2023-0142317 filed on Oct. 23, 2023, in the Korean Intellectual Property Office, the disclosure of which is incorporated by reference in its entirety herein.

1. TECHNICAL FIELD

Embodiments of the present disclosure are directed to a display device with reduced power consumption and increased display quality.

2. DISCUSSION OF TECHNICAL FIELD

Multimedia electronic devices, such as a television, a mobile phone, a tablet computer, a car navigation unit and a gaming device include a display device for displaying an image. The display device may include an organic light emitting display (OLED) device. OLED technology in televisions provides superior image quality with better contrast ratios and viewing angles compared to traditional light-emitting diode (LED) televisions. OLED screens in mobile phones offer excellent contrast, deep blacks, and vibrant colors.

The organic light emitting display device may include light emitting elements such as organic light emitting diodes that generate light by recombination of electrons and holes. The organic light emitting display device has a fast response speed and is driven with low power consumption.

SUMMARY

Embodiments of the present disclosure provide a display device with reduced power consumption and increased display quality.

According to an embodiment, a display device includes a plurality of data lines, a plurality of first gate lines arranged in a second direction, a plurality of second gate lines arranged in the second direction, and a plurality of pixels, each of which is connected to one corresponding data line among the plurality of data lines and one corresponding gate line among the plurality of first gate lines and the plurality of second gate lines. The plurality of pixels includes a first group of pixels and a second group of pixels. The plurality of data lines includes a first group of data lines is connected to the first group of pixels and a second group of data lines connected to the second group of pixels. A data signal is provided to the first group of pixels connected to the first group of data lines in a first sub-frame period of one frame period. A data signal is provided to the second group of pixels connected to the plurality of second group data lines in a second sub-frame period of the one frame period that is adjacent to the first sub-frame period.

The plurality of first gate lines and the plurality of second gate lines may alternate with one another in the second direction. The plurality of first gate lines may be sequentially activated in the first sub-frame period, and the plurality of second gate lines may be sequentially activated in the second sub-frame period.

The display device may further include a demultiplexer connected to the plurality of data lines. The demultiplexer may include a plurality of first control transistors connected to the first group of data lines in a one-to-one correspondence and a plurality of second control transistors connected to the second group of data lines in a one-to-one correspondence. The plurality of first control transistors may be controlled by a first control signal provided through a first control line, and the plurality of second control transistors may be controlled by a second control signal provided through a second control line.

In the first sub-frame period, the first control signal may have activation levels and inactivation levels alternating with one another, and the second control signal may have an inactivation level. In the second sub-frame period, the first control signal may have an inactivation level, and the second control signal may have activation levels and inactivation levels alternating with one another.

The plurality of pixels may include a first pixel that outputs light having a first color, a second pixel that outputs light having a second color different from the first color, a third pixel that outputs light having a third color different from the first color and the second color, and a fourth pixel that outputs light having the second color. The first pixel and the third pixel may be alternately arranged one by one in the first direction and the second direction, and the second pixel and the fourth pixel may be alternately arranged one by one in the first direction and the second direction.

The first group of pixels may include the first pixel and the third pixel, and the second group of pixels may include the second pixel and the fourth pixel.

Each of the first pixel and the third pixel may be electrically connected to a corresponding first gate line among the plurality of first gate lines, and each of the second pixel and the fourth pixel may be electrically connected to a corresponding second gate line among the plurality of second gate lines.

The first group of data lines may be connected to the first pixel and the third pixel, respectively, and the second group of data lines may be connected to the second pixel and the fourth pixel, respectively. The first group of data lines and the second group of data lines may alternate with one another.

The first group of data lines may include a first-first group data line connected to the first pixel and a first-second group data line connected to the third pixel. The second group of data lines may be connected to the second pixel and the fourth pixel, respectively. The first-first group data line, one of the second group of data lines, the first-second group data line, and another one of the second group of data lines may be sequentially arranged.

The first group of data lines may include a first-first group data line connected to the first pixel and the third pixel and a first-second group data line connected to the second pixel and the fourth pixel. The second group of data lines may include a second-first group data line connected to the second pixel and the fourth pixel and a second-second group data line connected to the first pixel and the third pixel. The first-first group data line, the second-first group data line, the second-second group data line, and the first-second group data line may be sequentially arranged.

The first group of data lines may include a first-first group data line connected to the first pixel, a first-second group data line connected to the second pixel and the fourth pixel, and a first-third group data line connected to the third pixel. The second group of data lines may include a second-first group data line connected to the third pixel, a second-second group data line connected to the second pixel and the fourth pixel, and a second-third group data line connected to the first pixel. The first-first group data line, the second-first group data line, the first-second group data line, the second-second group data line, the second-third group data line, the first-third group data line, the second-second group data line, and the first-second group data line may be sequentially arranged.

The first group of data lines may include a first-first group data line connected to the first pixel, a first-second group data line connected to the third pixel, and a first-third group data line connected to the second pixel and the fourth pixel. The second group of data lines may include a second-first group data line connected to the second pixel and the fourth pixel, a second-second group data line connected to the first pixel, and a second-third group data line connected to the third pixel. Te first-first group data line, the second-first group data line, the first-second group data line, the second-first group data line, the second-second group data line, the first-third group data line, the second-third group data line, and the first-third group data line may be sequentially arranged.

The first group of data lines may include a first-first group data line connected to the first pixel, a first-second group data line connected to the third pixel, and a first-third group data line connected to the second pixel and the fourth pixel. The plurality of second group data lines may include a second-first group data line connected to the second pixel and the fourth pixel, a second-second group data line connected to the first pixel, and a second-third group data line connected to the third pixel. The first-first group data line, the first-second group data line, the second-first group data line, the second-first group data line, the second-second group data line, the second-third group data line, the first-third group data line, and the first-third group data line may be sequentially arranged.

The first pixel and the third pixel may emit light in the first sub-frame period, and the second pixel and the fourth pixel may emit light in the second sub-frame period.

The first pixel, the second pixel, the third pixel, and the fourth pixel may emit light in the first sub-frame period and the second sub-frame period.

According to an embodiment, a display device includes a plurality of first data lines arranged in a first direction, a plurality of group data lines arranged in the first direction, a plurality of gate lines arranged in a second direction, a plurality of first pixels electrically connected to the plurality of first data lines and the plurality of gate lines, a plurality of second pixels electrically connected to the plurality of second data lines and the plurality of gate lines, and a demultiplexer. The demultiplexer includes a plurality of first control transistors connected to the plurality of first data lines in a one-to-one correspondence and a plurality of second control transistors connected to the plurality of second data lines in a one-to-one correspondence. In a first sub-frame period of one frame period, a first control signal to control the plurality of first control transistors has activations levels and inactivation levels alternating with one another, and a second control signal to control the plurality of second control transistors has an inactivation level. In a second sub-frame period of the second frame period that is adjacent to the first sub-frame period, the first control signal has an inactivation level, and the second control signal has activation levels and inactivation levels alternating with one another.

The plurality of gate lines may include a plurality of first gate lines electrically connected to the plurality of first pixels and a plurality of second gate lines electrically connected to the plurality of second pixels. The plurality of first gate lines may be sequentially activated in the first sub-frame period, and the plurality of second gate lines may be sequentially activated in the second sub-frame period.

The plurality of first pixels and the plurality of second pixels may include a first pixel that outputs light having a first color, a second pixel that outputs light having a second color different from the first color, a third pixel that outputs light having a third color different from the first color and the second color, and a fourth pixel that outputs light having the second color, and the first to fourth pixels may emit light in the one frame period.

In the first sub-frame period, the first pixel and the third pixel may emit light, and in the second sub-frame period, the second pixel and the fourth pixel may emit light. In the first sub-frame period and the second sub-frame period, the first pixel, the second pixel, the third pixel, and the fourth pixel may emit light.

According to an embodiment, a display device includes a plurality of data lines arranged in a first direction, a plurality of gate lines arranged in a second direction, a plurality of pixels electrically connected to the plurality of data lines and the plurality of gate lines, a plurality of first control transistors connected to some of the plurality of data lines in a one-to-one correspondence, and a plurality of second control transistors connected to the other data lines among the plurality of data lines in a one-to-one correspondence. A data signal is provided only to the some data lines connected to the plurality of first control transistors in a first sub-frame period of one frame period. A data signal is provided only to the other data lines connected to the plurality of second control transistors in a second sub-frame period of the one frame period that is adjacent to the first sub-frame period.

BRIEF DESCRIPTION OF THE FIGURES

FIG. 10 is a view for an operation of the display device according to an embodiment of the present disclosure.

DETAILED DESCRIPTION

Embodiments will now be described more fully hereinafter with reference to the accompanying drawings. Embodiments may, however, be provided in different forms and should not be construed as limiting. The same reference numbers may indicate the same components throughout the disclosure.

In this specification, when it is mentioned that a component (or, an area, a layer, a part, etc.) is referred to as being "on", "connected to" or "coupled to" another component, this means that the component may be directly on, connected to, or coupled to the other component or a third component may be present therebetween.

The terms "part" and "unit" may mean a software component or a hardware component that performs a specific function. The hardware component may include, for example, a field-programmable gate array (FPGA) or an application-specific integrated circuit (ASIC). The software component may refer to executable code and/or data used by executable code in an addressable storage medium. Thus, software components may be, for example, object-oriented software components, class components, and working components, and may include processes, functions, properties, procedures, subroutines, program code segments, drivers, firmware, micro-codes, circuits, data, databases, data structures, tables, arrays or variables.

Hereinafter, embodiments of the present disclosure will be described with reference to the accompanying drawings.

Figure 1:
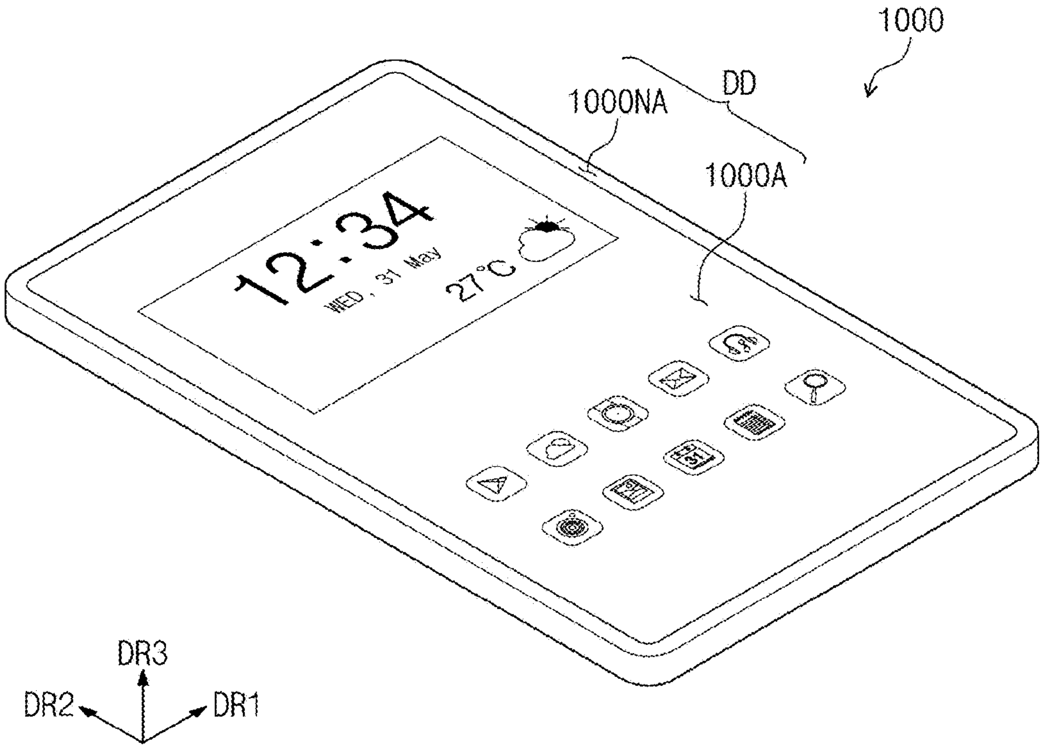
FIG. 1 is a perspective view of an electronic device according to an embodiment of the present disclosure.

FIG. 1 is a perspective view of an electronic device 1000 according to an embodiment of the present disclosure.

Referring to FIG. 1, it is exemplified that the electronic device 1000 is a mobile phone. The electronic device 1000 may include a display device DD. An active region 1000A and a peripheral region 1000NA may be defined in the display device DD. The active region 1000A may refer to the part of the display where light emission occurs. The display device DD may display an image through the active region 1000A. The active region 1000A may include a plane defined by a first direction DR1 and a second direction DR2. The peripheral region 1000NA may surround the periphery of the active region 1000A. In an embodiment of the present disclosure, the peripheral region 1000NA is omitted.

The thickness direction of the electronic device 1000 or the display device DD may be parallel to a third direction DR3 that crosses the first direction DR1 and the second direction DR2. Accordingly, front surfaces (or, upper surfaces) and rear surfaces (or, lower surfaces) of members constituting the electronic device 1000 or the display device DD may be defined based on the third direction DR3.

Figure 2:
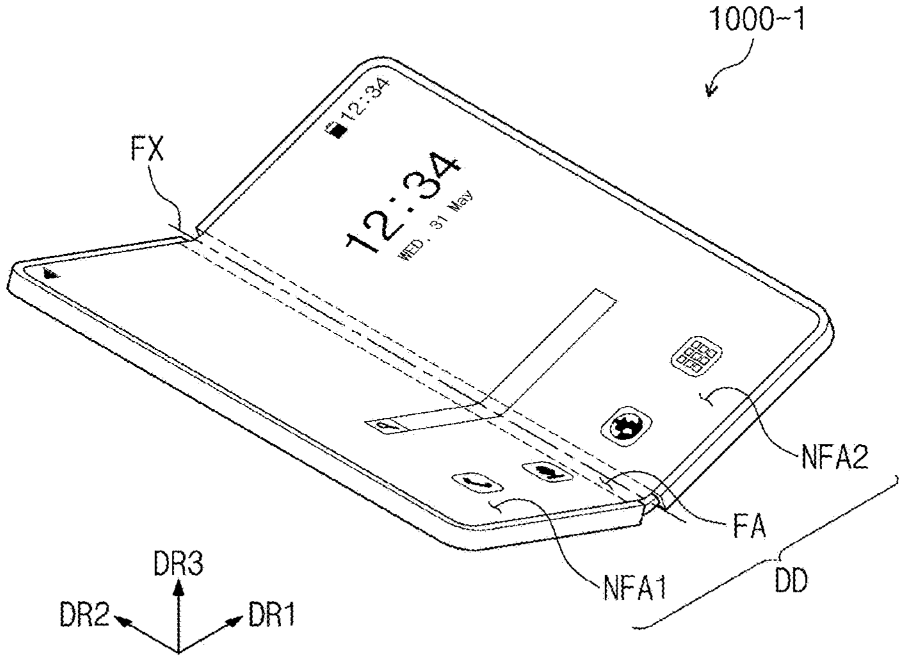
FIG. 2 is a perspective view of an electronic device according to an embodiment of the present disclosure.

FIG. 2 is a perspective view of an electronic device 1000-1 according to an embodiment of the present disclosure.

Referring to FIG. 2, the electronic device 1000-1 may include a display device DD. The display device DD may include a folding region FA and a plurality of non-folding regions NFA1 and NFA2. The non-folding regions NFA1 and NFA2 may include the first non-folding region NFA1 and the second non-folding region NFA2. The folding region FA may be disposed between the first non-folding region NFA1 and the second non-folding region NFA 2. The folding region FA may be referred to as a foldable region, and the first and second non-folding regions NFA1 and NFA 2 may be referred to as first and second non-foldable regions. For example, the non-foldable regions may be rigid to prevent the creation of additional folding regions.

As illustrated in FIG. 2, the folding region FA may be folded about a folding axis FX parallel to the second direction DR2. The folding region FA may have a predetermined curvature and a predetermined radius of curvature in a folded state of the electronic device 1000-1. The electronic device 1000-1 may be folded in an in-folding manner such that the first non-folding region NFA1 and the second non-folding region NFA 2 face each other and a display surface is not exposed to the outside. For example, images may not be visible when the electronic device 1000-1 is an in-folding state.

In an embodiment of the present disclosure, the electronic device 1000-1 may be folded in an out-folding manner such that the display surface is exposed to the outside. For example, images may be visible when the electronic device 1000-1 is in an out-folding state. In an embodiment of the present disclosure, the electronic device 1000-1 may be folded in an in-folding or out-folding manner in an unfolded state. However, the present disclosure is not limited thereto.

Although FIG. 2 illustrates an example where a single folding axis FX is defined in the electronic device 1000-1, the present disclosure is not limited thereto. For example, a plurality of folding axes may be defined in the electronic device 1000-1, and the electronic device 1000-1 may be folded about the plurality of folding axes in an in-folding or out-folding manner in the unfolded state.

While the electronic devices 1000 and 1000-1 are illustrated as having a bar-type shape electronic with reference to FIGS. 1 and 2, respectively, the present disclosure is not limited thereto. For example, the following descriptions may be applied to various electronic devices such as a curved electronic device, a rollable electronic device, and a slidable electronic device.

Figure 3:
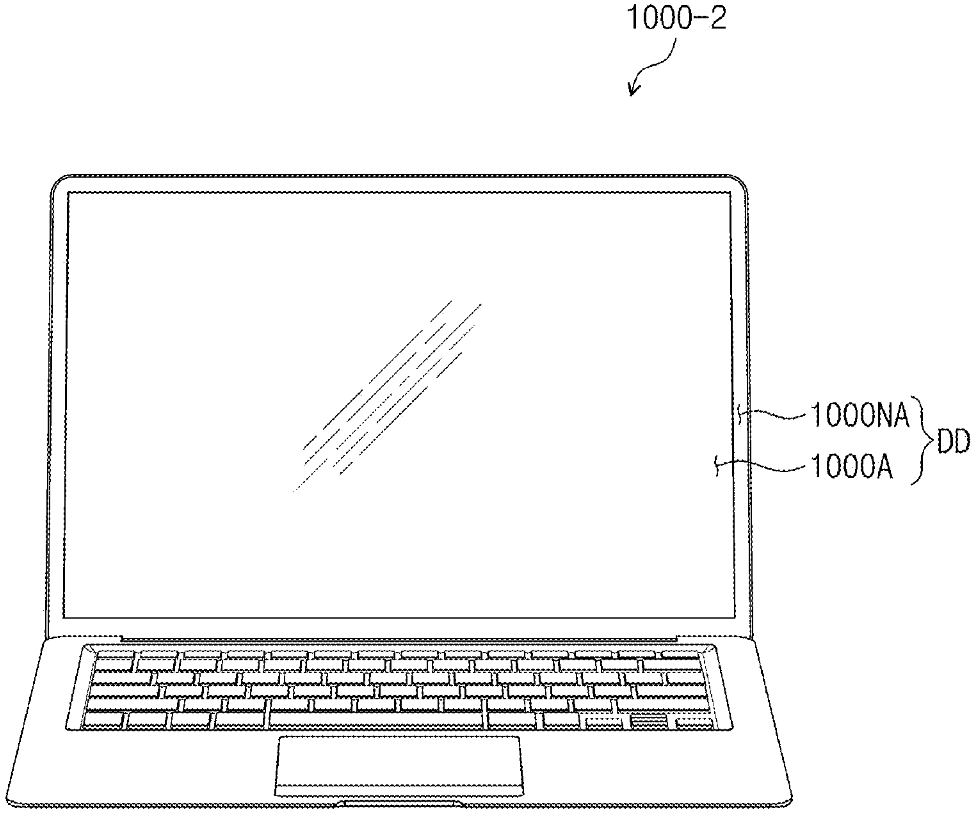
FIG. 3 is a perspective view of an electronic device according to an embodiment of the present disclosure.

FIG. 3 is a perspective view of an electronic device 1000-2 according to an embodiment of the present disclosure.

Referring to FIG. 3, it is exemplified that the electronic device 1000-2 is a notebook computer. The electronic device 1000-2 may include a display device DD. An active region 1000A and a peripheral region 1000NA may be defined in the display device DD. The display device DD may display an image through the active region 1000A.

The electronic devices 1000, 1000-1, or 1000-2 may be activated depending on an electrical signal. For example, the electronic devices 1000, 1000-1, or 1000-2 may be a mobile phone, a foldable mobile phone, a notebook computer, a television, a tablet computer, a car navigation unit, a game machine, or a wearable device, but are not limited thereto. The wearable device, which is worn on a part of a user's body, may include a head mounted display (HMD) that implements extended Reality (XR).

Figure 4:
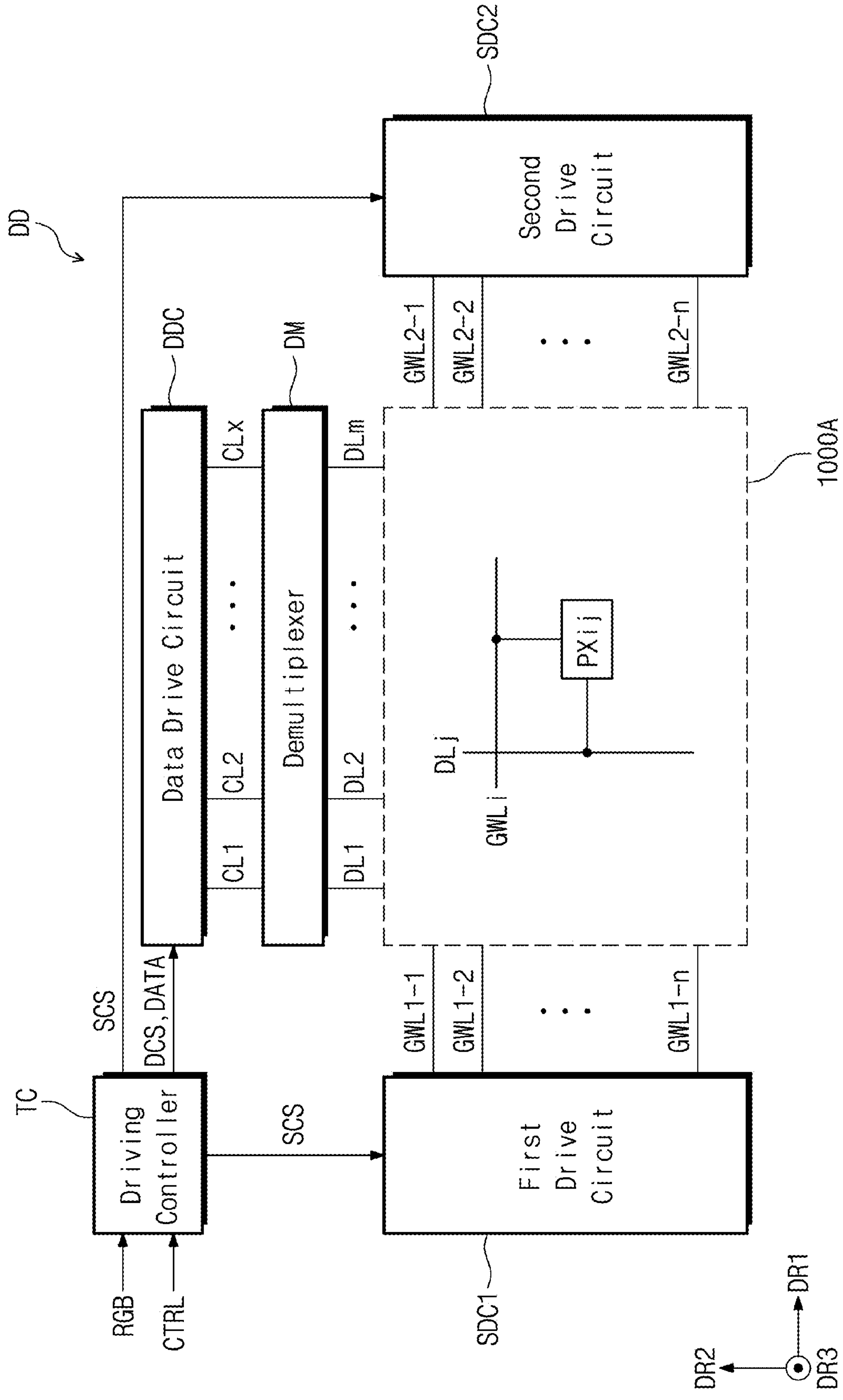
FIG. 4 is a block diagram of a display device according to an embodiment of the present disclosure.

FIG. 4 is a block diagram of a display device DD according to an embodiment of the present disclosure. The electronic devices 1000, 1000-1, or 1000-2 may include the display device DD.

Referring to FIG. 4, the display device DD may include a driving controller TC (e.g., a controller circuit), a data drive circuit DDC, a demultiplexer DM, a first drive circuit SDC1, a second drive circuit SDC2, and a pixel PXij disposed in the active region 1000A.

In an embodiment of the present disclosure, the demultiplexer DM, the first drive circuit SDC1, the second drive circuit SDC2, and the pixel PXij disposed in the active region 1000A may be components included in a display panel 100 (refer to FIG. 6) that will be described below. The driving controller TC and the data drive circuit DDC may be implemented with integrated circuits (ICs) and may be directly mounted on a certain region of the display panel 100, or may be mounted on a separate printed circuit board in a chip on film (COF) manner and may be electrically connected to the display panel 100.

The display device DD may include first gate lines GWL1-1 to GWL1-*n*, second gate lines GWL2-1 to GWL2-*n*, and data lines DL1 to DLm. The data lines DL1 to DLm may be arranged in the first direction DR1, the first gate lines GWL1-1 to GWL1-*n* may be arranged in the second direction DR2 crossing the first direction DR1, and the second gate lines GWL2-1 to GWL2-*n* may be arranged in the second direction DR2. The first gate lines GWL1-1 to GWL1-*n* may be referred to as the first write scan lines and the second gate lines GWL2-1 to GWL2-*n* may be referred to as the second write scan lines.

The display device DD may include a plurality of pixels that are connected to the first gate lines GWL1-1 to GWL1-*n*, the second gate lines GWL2-1 to GWL2-*n*, and the data lines DL1 to DLm. In FIG. 4, one pixel PXij is representatively illustrated. The one pixel PXij may be electrically connected to one gate line GWLi among the first gate lines GWL1-1 to GWL1-*n* and the second gate lines GWL2-1 to GWL2-*n* and one data line DLj among the data lines DL1 to DLm, where m and n are integers greater than 1. Where i is an integer greater than or equal to 1 and less than or equal to n, and j is an integer greater than or equal to 1 and less than or equal to m.

In an embodiment of the present disclosure, signal lines connected to the pixel PXij may be variously set depending on a circuit structure of the pixel PXij. In FIG. 4, one gate line and one data line are illustrated as an example, and the pixel PXij may be electrically connected to lines other than the lines illustrated in FIG. 4.

The driving controller TC receives an image signal RGB and a control signal CTRL. The driving controller TC generates an image data signal DATA by converting the data format of the image signal RGB according to the specification of an interface with the data drive circuit DDC. In addition, the driving controller TC generates a first control signal DCS for controlling the data drive circuit DDC and a second control signal SCS for controlling the first and second drive circuits SDC1 and SDC2.

In an embodiment of the present disclosure, the display device DD further includes channel lines CL1 to CLx, where x is an integer greater than 1 and less than m. The channel lines CL1 to CLx may be selectively electrically connected to the data lines DL1 to DLm through the demultiplexer DM. The number of channel lines CL1 to CLx may be less than the number of data lines DL1 to DLm. Although it has been described that the demultiplexer DM is included in the display panel 100, the present disclosure is not particularly limited thereto. For example, the demultiplexer DM may be included in the data drive circuit DDC, may be implemented with a separate integrated circuit, or may be integrated into a printed circuit board on which the data drive circuit DDC is mounted.

According to an embodiment of the present disclosure, the number of channels of data output from the data drive circuit DDC by the demultiplexer DM is less than the number of data lines DL1 to DLm. The number of channels may correspond to the number of channel lines CL1 to CLx. In this case, the number of IC chips including the data drive circuit DDC included in the medium or large-sized electronic device 1000-2 of FIG. 3 may be decreased as the number of channels is decreased. Further, as the number of channels of a single IC chip including the data drive circuit DDC is decreased, the cost of the IC chip may be reduced.

The data drive circuit DDC receives the first control signal DCS and the image data signal DATA from the driving controller TC. The data drive circuit DDC converts the image data signal DATA into data signals and outputs the data signals to the channel lines CL1 to CLx. The data signals are analog voltages corresponding to gray level values of the image data signal DATA. The demultiplexer DM may electrically connect some of the data lines DL1 to DLm to the channel lines CL1 to CLx, and the data signals may be output to some of the data lines DL1 to DLm. For example, the demultiplexer DM may electrically connect some of the data lines DL1 to DLm to one of the channel lines CL1 to CLx.

In an embodiment, the first drive circuit SDC1 is connected to the first gate lines GWL1-1 to GWL1-*n*, and the second drive circuit SDC2 is connected to the second gate lines GWL2-1 to GWL2-*n*. The first and second drive circuits SDC1 and SDC2 may receive the second control signal SCS from the driving controller TC and may supply scan signals to the first gate lines GWL1-1 to GWL1-*n* and the second gate lines GWL2-1 to GWL2-*n* based on the second control signal SCS.

The scan signals may be set to voltages that cause transistors receiving the scan signals to be turned on. For example, a scan signal provided to a P-type transistor may be set to a logic low level, and a scan signal provided to an N-type transistor may be set to a logic high level. Hereinafter, when a scan signal is supplied or activated, it may mean that the scan signal is supplied at a logic level that turns on a transistor controlled by the scan signal. Further, when a scan signal is deactivated, it may mean that a scan signal is supplied at a logic level that turns off a transistor controlled by the scan signal.

In an embodiment of the present disclosure, the first drive circuit SDC1 and the second drive circuit SDC2 are included in the display panel 100. For example, the pixels PXij includes a light emitting element ED (refer to FIG. 5) and a pixel circuit PDC (refer to FIG. 5) that controls light emission of the light emitting element ED. The pixel circuit PDC may include one or more transistors and one or more capacitors. The first drive circuit SDC1 and the second drive circuit SDC2 may include transistors formed through the same process as the pixel circuit PDC.

In an embodiment of the present disclosure, the first drive circuit SDC1 and the second drive circuit SDC2 are spaced apart from each other with the active region 1000A therebetween. However, the present disclosure is not limited thereto. For example, the first drive circuit SDC1 and the second drive circuit SDC2 may be disposed on the same side of the active region 1000A, or at least a portion of the first drive circuit SDC1 and at least a portion of the second drive circuit SDC2 may be disposed in the active region 1000A.

Figure 5:
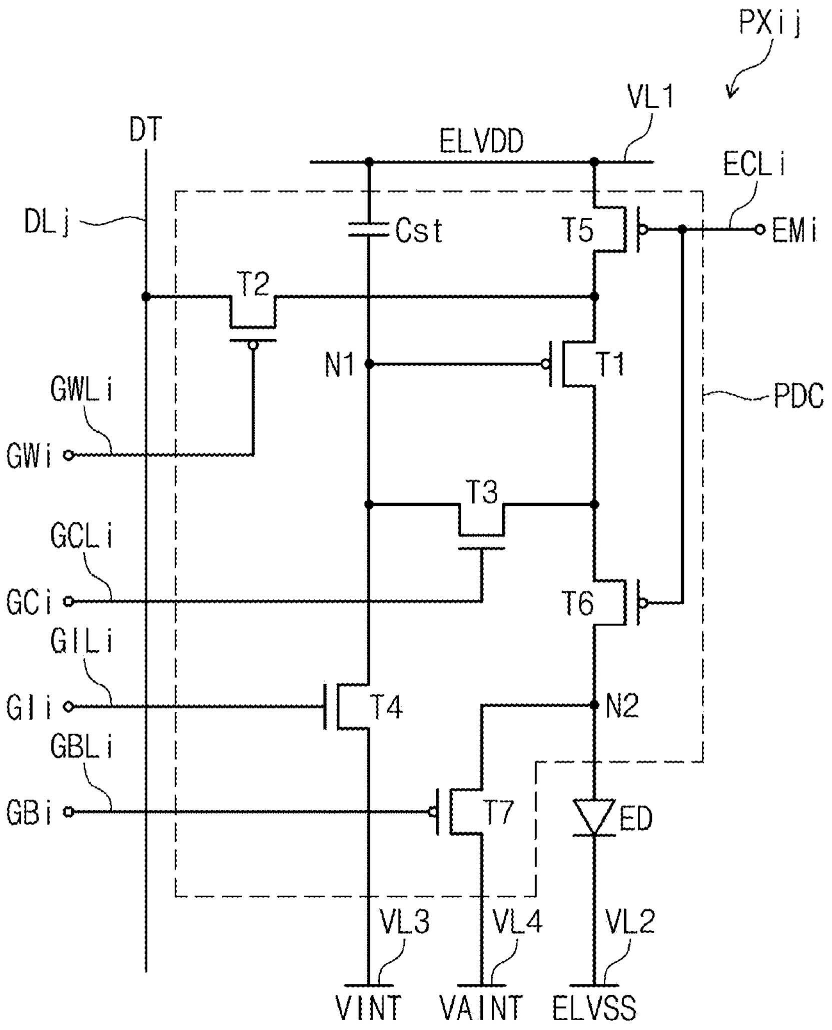
FIG. 5 is an equivalent circuit diagram of a pixel according to an embodiment of the present disclosure.

FIG. 5 is an equivalent circuit diagram of the pixel PXij according to an embodiment of the present disclosure.

Referring to FIG. 5, the pixel PXij includes the light emitting element ED and the pixel circuit PDC. The light emitting element ED may be a light emitting diode. In an embodiment of the present disclosure, the light emitting element ED may be an organic light emitting diode including an organic light emitting layer, but is not limited thereto. The pixel circuit PDC may control the amount of current flowing through the light emitting element ED in response to a data signal DT. The light emitting element ED may emit light having a certain luminance in response to the amount of current provided from the pixel circuit PDC.

The pixel drive circuit PDC may include first to seventh transistors T1, T2, T3, T4, T5, T6, and T7 and one capacitor Cst. The configuration of the pixel circuit PDC according to the present disclosure is not limited to the embodiment illustrated in FIG. 5. The pixel circuit PDC illustrated in FIG. 5 is merely illustrative, and various changes and modifications may be made to the configuration of the pixel circuit PDC.

At least one of the first to seventh transistors T1, T2, T3, T4, T5, T6, and T7 may be a transistor having a low-temperature polycrystalline silicon (LTPS) semiconductor layer. At least one of the first to seventh transistors T1, T2, T3, T4, T5, T6, and T7 may be a transistor having an oxide semiconductor layer. For example, the third and fourth transistors T3 and T4 may be oxide semiconductor transistors, and the first, second, fifth, sixth, and seventh transistors T1, T2, T5, T6, and T7 may be transistors having LTPS semiconductor layer.

The first transistor T1 may directly affect the brightness of the light emitting element ED. The first transistor T1 may include a semiconductor layer formed of polycrystalline silicon having high reliability. Thus, a display device having a high resolution may be implemented. An oxide semiconductor has high carrier mobility and low leakage current, and thus a voltage drop is not great even though an operating time is long. That is, the color of an image is not greatly changed depending on a voltage drop even during a low-frequency operation, and thus the low-frequency operation is possible. Since the oxide semiconductor has a low leakage current, at least one of the third transistor T3, which is connected to a gate electrode of the first transistor T1, and the fourth transistor T4 may be implemented by an oxide semiconductor to reduce power consumption while preventing leakage current that is likely to flow to the gate electrode of the first transistor T1.

Some of the first to seventh transistors T1, T2, T3, T4, T5, T6, and T7 may be P-type transistors, and the others may be N-type transistors. For example, the first, second, fifth, sixth, and seventh transistors T1, T2, T5, T6, and T7 may be P-type transistors, and the third and fourth transistors T3 and T4 may be N-type transistors.

However, the configuration of the pixel circuit PDC according to the present disclosure is not limited to the embodiment illustrated in FIG. 5. The pixel circuit PDC illustrated in FIG. 5 is merely illustrative, and various changes and modifications may be made to the configuration of the pixel circuit PDC. For example, the first to seventh transistors T1, T2, T3, T4, T5, T6, and T7 may all be P-type transistors or N-type transistors. Alternatively, the first, second, fifth, and sixth transistors T1, T2, T5, and T6 may be P-type transistors, and the third, fourth, and seventh transistors T3, T4, and T7 may be N-type transistors.

The i-th initialization scan line GILi, the i-th compensation scan line GCLi, the i-th gate line GWLi (also referred to as the gate line GWLi), the i-th black scan line GBLi, and the i-th emission control line ECLi may transmit the i-th initialization scan signal GIi, the i-th compensation scan signal GCi, the i-th write scan signal GWi, the i-th black scan signal GBi, and the i-th emission control signal EMi to the pixel PXij, respectively. The j-th data line DLj (also referred to as the data line DLj) transmits the data signal DT to the pixel PXij. The data signal DT may have a voltage level corresponding to an image signal.

First and second drive voltage lines VL1 and VL2 may transmit a first drive voltage ELVDD and a second drive voltage ELVSS to the pixel PXij, respectively. In addition, first and second initialization voltage lines VL3 and VL4 may transmit a first initialization voltage VINT and a second initialization voltage VAINT to the pixel PXij, respectively.

The first transistor T1 is connected between the first drive voltage line VL1, which receives the first drive voltage ELVDD, and the light emitting element ED. The first transistor T1 includes a first electrode connected to the first drive voltage line VL1 via the fifth transistor T5, a second electrode connected to a pixel electrode (or, referred to as an anode) of the light emitting element ED via the sixth transistor T6, and a third electrode (e.g., a gate electrode) connected to one end of the first capacitor Cst (e.g., a first node N1). The first transistor T1 may receive the data signal DT that the j-th data line DLj transmits depending on a switching operation of the second transistor T2 and may supply a drive current to the light emitting element ED.

The second transistor T2 is connected between the j-th data line DLj and the first electrode of the first transistor T1. The second transistor T2 includes a first electrode connected to the j-th data line DLj, a second electrode connected to the first electrode of the first transistor T1, and a third electrode (e.g., a gate electrode) connected to the i-th gate line GWLi. The second transistor T2 may be turned on depending on the i-th write scan signal GWi transmitted through the i-th gate line GWLi and may transmit, to the first electrode of the first transistor T1, the data signal DT transmitted from the j-th data line DLj.

The third transistor T3 is connected between the second electrode of the first transistor T1 and the first node N1. The third transistor T3 includes a first electrode connected to the third electrode of the first transistor T1, a second electrode connected to the second electrode of the first transistor T1, and a third electrode (e.g., a gate electrode) connected to the i-th compensation scan line GCLi. The third transistor T3 may be turned on depending on the i-th compensation scan signal GCi transmitted through the i-th compensation scan line GCLi and may diode-connect the first transistor T1 by connecting the third electrode of the first transistor T1 and the second electrode of the first transistor T1.

The fourth transistor T4 is connected between the first initialization voltage line VL3 through which the first initialization voltage VINT is applied and the first node N1.

The fourth transistor T4 includes a first electrode connected to the first initialization voltage line VL3 through which the first initialization voltage VINT is transmitted, a second electrode connected to the first node N1, and a third electrode (e.g., a gate electrode) connected to the i-th initialization scan line GILi. The fourth transistor T4 is turned on depending on the i-th initialization scan signal GIi transmitted through the i-th initialization scan line GILi. The turned-on fourth transistor T4 initializes the potential of the third electrode of the first transistor T1 (that is, the potential of the first node N1) by transmitting the first initialization voltage VINT to the first node N1.

The fifth transistor T5 includes a first electrode connected to the first drive voltage line VL1, a second electrode connected to the first electrode of the first transistor T1, and a third electrode (e.g., a gate electrode) connected to the i-th emission control line ECLi. The sixth transistor T6 includes a first electrode connected to the second electrode of the first transistor T1, a second electrode connected to the pixel electrode of the light emitting element ED (e.g., a second node N2), and a third electrode (e.g., a gate electrode) connected to the i-th emission control line ECLi.

The fifth and sixth transistors T5 and T6 are simultaneously turned on depending on the i-th emission control signal EMi transmitted through the i-th emission control line ECLi. The first drive voltage ELVDD applied through the turned-on fifth transistor T5 may be compensated for through the diode-connected first transistor T1 and thereafter may be transmitted to the light emitting element ED through the sixth transistor T6.

The seventh transistor T7 includes a first electrode connected to the second initialization voltage line VL4 through which the second initialization voltage VAINT is transmitted, a second electrode connected to the second node N2, and a third electrode (e.g., a gate electrode) connected to the i-th black scan line GBLi. In an embodiment, the second initialization voltage VAINT has a voltage level lower than or equal to the voltage level of the first initialization voltage VINT.

The one end of the first capacitor Cst is connected to the third electrode of the first transistor T1, and the opposite end of the first capacitor Cst is connected to the first drive voltage line VL1. A cathode of the light emitting element ED may be connected to the second drive voltage line VL2 that transmits the second drive voltage ELVSS. In an embodiment, the second drive voltage ELVSS has a lower voltage level than the first drive voltage ELVDD.

Figure 6:
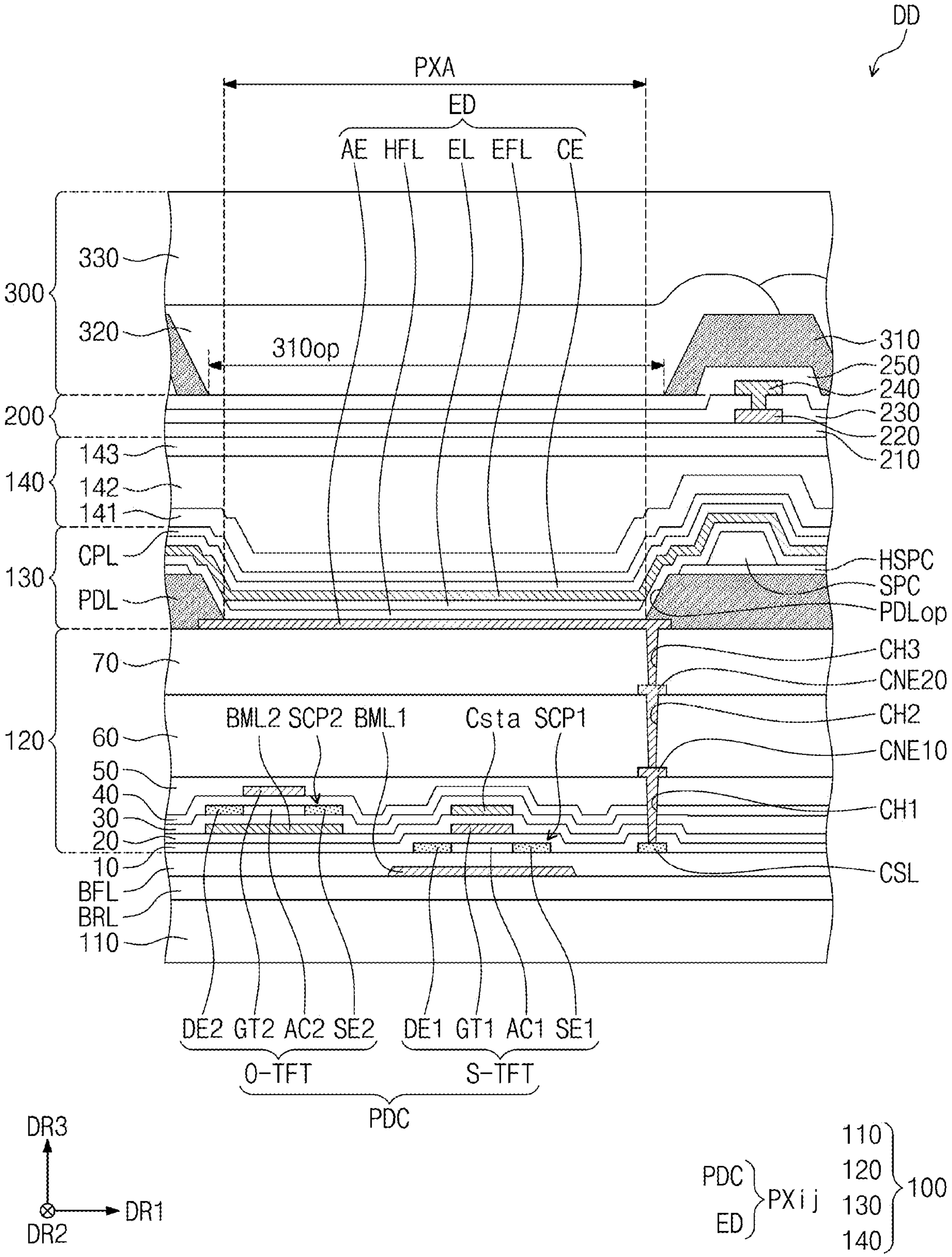
FIG. 6 is a sectional view illustrating a portion of the display device according to an embodiment of the present disclosure.

FIG. 6 is a sectional view illustrating a portion of the display device DD according to an embodiment of the present disclosure.

Referring to FIG. 6, the display device DD may include the display panel 100, a sensor 200, and an anti-reflection layer 300. At least one of the sensor 200 and the anti-reflection layer 300 may be omitted depending on the electronic devices to which the display device DD is applied. Furthermore, the display device DD may further include other components, for example, a window in addition to the components illustrated in FIG. 6.

The display panel 100 may include a base layer 110, a barrier layer BRL, a buffer layer BFL, a circuit layer 120, an element layer 130, and an encapsulation layer 140.

The base layer 110 may be a glass substrate, a metal substrate, a polymer substrate, or the like. However, the base layer 110 is not limited thereto. For example, the base layer 110 may be an inorganic layer, an organic layer, or a composite layer. In an embodiment of the present disclosure, the base layer 110 includes a plurality of sub-base layers. For example, each of the plurality of sub-base layers may include at least one of a polyimide-based resin, an acrylic-based resin, a methacrylic-based resin, a polyisoprene-based resin, a vinyl-based resin, an epoxy-based resin, a urethane-based resin, a celluosic-based resin, a siloxane-based resin, a polyamide-based resin, and a perylene-based resin. A "~~"-based resin described herein means a resin including a "~~" functional group.

The barrier layer BRL may be disposed on the base layer 110. The buffer layer BFL may be disposed on the barrier layer BRL. The buffer layer BFL may prevent diffusion of metal atoms or impurities from the base layer 110 into a first semiconductor pattern SCP1. In addition, the buffer layer BFL may adjust the speed at which heat is provided during a crystallization process for forming the first semiconductor pattern SCP1, thereby enabling the first semiconductor pattern SCP1 to be uniformly formed.

Each of the barrier layer BRL and the buffer layer BFL may include a plurality of inorganic layers. Each of the plurality of inorganic layers may include at least one of silicon oxide, silicon nitride, silicon oxy nitride, and amorphous silicon, but is not limited thereto.

A first lower metal layer BML1 may be disposed between the barrier layer BRL and the buffer layer BFL. The first lower metal layer BML1 may be referred to as the first lower layer, the first lower light blocking layer, the first lower electrode layer, the first lower shielding layer, the first light blocking layer, the first metal layer, the first electrode layer, the first shielding layer, or the first overlap layer. Unlike in FIG. 6, the first lower metal layer BML1 may be disposed between the barrier layer BRL and a plurality of inorganic layers. In an embodiment of the present disclosure, the first lower metal layer BML1 is omitted.

One pixel PXij may include a light emitting element ED and a pixel circuit PDC. The circuit layer 120 may be disposed on the buffer layer BFL, and the element layer 130 may be disposed on the circuit layer 120. Referring to FIG. 6, the pixel circuit PDC may be included in the circuit layer 120, and the light emitting element ED may be included in the element layer 130.

In FIG. 6, a silicon thin film transistor S-TFT and an oxide thin film transistor O-TFT of the pixel circuit PDC are illustrated as an example. The silicon thin film transistor S-TFT may be one of the first, second, fifth, sixth, and seventh transistors T1, T2, T5, T6, and T7 described with reference to FIG. 5, and the oxide thin film transistor O-TFT may be one of the third and fourth transistors T3 and T4.

The first semiconductor pattern SCP1 may be disposed on the buffer layer BFL. The first semiconductor pattern SCP1 may include a silicon semiconductor. For example, the silicon semiconductor may include amorphous silicon or polycrystalline silicon. For example, the first semiconductor pattern SCP1 may include low-temperature polycrystalline silicon.

FIG. 6 illustrates only a portion of the first semiconductor pattern SCP1 disposed on the buffer layer BFL, and the first semiconductor pattern SCP1 may be additionally disposed in other regions. The first semiconductor pattern SCP1 may be arranged across pixels according to a specific rule. The first semiconductor pattern SCP1 may have different electrical properties depending on whether the first semiconductor pattern SCP1 is doped or not. The first semiconductor pattern SCP1 may include a first region having a high conductivity and a second region having a low conductivity. The first region may be doped with an N-type dopant or a P-type dopant. A P-type transistor may include a doped region that is doped with the P-type dopant, and an N-type transistor may include a doped region that is doped with the N-type dopant. The second region may be an un-doped region, or may be a region more lightly doped than the first region.

In an embodiment, the conductivity of the first region is higher than the conductivity of the second region, and the first region may substantially serve as an electrode or a signal line. The second region may substantially correspond to an active region (or, channel) of a transistor. In other words, one portion of the first semiconductor pattern SCP1 may be an active region of a transistor, another portion thereof may be a source or a drain of the transistor, and another portion thereof may be a connecting electrode or a connecting signal line.

A source region SE1, an active region AC1, and a drain region DE1 of the silicon thin film transistor S-TFT may be formed from the first semiconductor pattern SCP1. The source regions SE1 and the drain regions DE1 may extend from the active regions AC1 in opposite directions on a given section.

In FIG. 6, a portion of a connecting signal line CSL formed from the first semiconductor pattern SCP1 is illustrated. The connecting signal line CSL may be electrically connected to the second electrode of the sixth transistor T6 (refer to FIG. 5) and the second electrode of the seventh transistor T7 (refer to FIG. 5).

The circuit layer 120 may include a plurality of inorganic layers and a plurality of organic layers. In an embodiment, first to fifth insulating layers 10, 20, 30, 40, and 50 sequentially stacked on the buffer layer BFL are inorganic layers, and sixth and seventh insulating layers 60 and 70 are organic layers. The first to fifth insulating layers 10, 20, 30, 40, and 50 may be referred to as inorganic insulating layers. In an embodiment of the present disclosure, other insulating layers may be added in addition to the insulating layers illustrated in FIG. 6, and at least some of the insulating layers illustrated in FIG. 6 may be omitted.

The first insulating layer 10 may be disposed on the buffer layer BFL. The first insulating layer 10 may cover the first semiconductor pattern SCP1. The first insulating layer 10 may be an inorganic layer and/or an organic layer and may have a single-layer structure or a multi-layer structure. The first insulating layer 10 may include at least one of aluminum oxide, titanium oxide, silicon oxide, silicon nitride, silicon oxy nitride, zirconium oxide, and hafnium oxide. In this embodiment, the first insulating layer 10 may be a single silicon oxide layer. The first insulating layer 10 and the insulating layers of the circuit layer 120 that will be described below may have a single-layer structure or a multi-layer structure.

A gate electrode GT1 of the silicon thin film transistor S-TFT may be disposed on the first insulating layer 10. The gate electrode GT1 may be a portion of a metal pattern. The gate electrode GT1 overlaps the active region AC1. The gate electrode GT1 may function as a mask in a process of doping the first semiconductor pattern SCP1. The gate electrode GT1 may include titanium, silver, an alloy containing silver, molybdenum, an alloy containing molybdenum, aluminum, an alloy containing aluminum, aluminum nitride, tungsten, tungsten nitride, copper, indium tin oxide, or indium zinc oxide, but is not limited thereto.

The second insulating layer 20 may be disposed on the first insulating layer 10 and may cover the gate electrode GT1. The second insulating layer 20 may be an inorganic layer and may have a single-layer structure or a multi-layer structure. The second insulating layer 20 may include at least one of silicon oxide, silicon nitride, and silicon oxy nitride. In this embodiment, the second insulating layer 20 may have a single-layer structure including a silicon nitride layer.

The third insulating layer 30 may be disposed on the second insulating layer 20. The third insulating layer 30 may be an inorganic layer and may have a single-layer structure or a multi-layer structure. For example, the third insulating layer 30 may have a multi-layer structure including a silicon oxide layer and a silicon nitride layer. One electrode Csta of the capacitor Cst (refer to FIG. 5) may be disposed between the second insulating layer 20 and the third insulating layer 30. In addition, the other electrode of the capacitor Cst may be disposed between the first insulating layer 10 and the second insulating layer 20.

A second semiconductor pattern SCP2 may be disposed on the third insulating layer 30. The second semiconductor pattern SCP2 may include an oxide semiconductor. The oxide semiconductor may include a plurality of regions distinguished from each other depending on whether metal oxide is reduced or not. A region where metal oxide is reduced (hereinafter, referred to as the reduced region) has a higher conductivity than a region where metal oxide is not reduced (hereinafter, referred to as the non-reduced region). The reduced region substantially serves as a source/drain of a transistor or a signal line. The non-reduced region substantially corresponds to an active region (or, a semiconductor region or a channel) of the transistor. In other words, one portion of the second semiconductor pattern SCP2 may be an active region of a transistor, another portion thereof may be a source or drain region of the transistor, and another portion thereof may be a signal transmission region.

A source region SE2, an active region AC2, and a drain region DE2 of the oxide thin film transistor O-TFT may be formed from the second semiconductor pattern SCP2. The source regions SE2 and the drain regions DE2 may extend from the active regions AC2 in opposite directions on a given section.

The oxide thin film transistor O-TFT may overlap a second lower metal layer BML2. The second lower metal layer BML2 may be referred to as the second lower layer, the second lower light blocking layer, the second lower electrode layer, the second lower shielding layer, the second light blocking layer, the second metal layer, the second electrode layer, the second shielding layer, or the second overlap layer.

Light incident from below the display panel 100 may be blocked by the second lower metal layer BML2 and thus not provided to the active region AC2 of the oxide thin film transistor O-TFT. The second lower metal layer BML2 may be disposed between the second insulating layer 20 and the third insulating layer 30. The second lower metal layer BML2 may include the same material as the one electrode Csta of the capacitor Cst (refer to FIG. 5) and may be formed through the same process as that of the one electrode Csta of the capacitor Cst (refer to FIG. 5). In an embodiment of the present disclosure, the second lower metal layer BML2 is omitted.

The fourth insulating layer 40 may be disposed on the third insulating layer 30. The fourth insulating layer 40 may cover the second semiconductor pattern SCP2. The fourth insulating layer 40 may be an inorganic layer and may have a single-layer structure or a multi-layer structure. The fourth insulating layer 40 may include at least one of aluminum oxide, titanium oxide, silicon oxide, silicon nitride, silicon oxy nitride, zirconium oxide, and hafnium oxide. In this embodiment, the fourth insulating layer 40 may have a single-layer structure including silicon oxide.

A gate electrode GT2 of the oxide thin film transistor O-TFT may be disposed on the fourth insulating layer 40. The gate electrode GT2 may be a portion of a metal pattern. The gate electrode GT2 overlaps the active region AC2. The gate electrode GT2 may function as a mask in a process of reducing the second semiconductor pattern SCP2. In an embodiment of the present disclosure, the second lower metal layer BML2 functions as a bottom gate electrode. For example, the second lower metal layer BML2 may be electrically connected to the gate electrode GT2, or may receive the same signal as the gate electrode GT2. However, the present disclosure is not limited thereto.

The fifth insulating layer 50 may be disposed on the fourth insulating layer 40 and may cover the gate electrode GT2. The fifth insulating layer 50 may be an inorganic layer and/or an organic layer and may have a single-layer structure or a multi-layer structure. For example, the fifth insulating layer 50 may have a multi-layer structure including a silicon oxide layer and a silicon nitride layer.

A first connecting electrode CNE10 may be disposed on the fifth insulating layer 50. The first connecting electrode CNE10 may be connected to the connecting signal line CSL through a first contact hole CH1 penetrating the first to fifth insulating layers 10, 20, 30, 40, and 50.

The sixth insulating layer 60 may be disposed on the fifth insulating layer 50. A second connecting electrode CNE20 may be disposed on the sixth insulating layer 60. The second connecting electrode CNE20 may be connected to the first connecting electrode CNE10 through a second contact hole CH2 penetrating the sixth insulating layer 60. The seventh insulating layer 70 may be disposed on the sixth insulating layer 60 and may cover the second connecting electrode CNE20.

Each of the sixth insulating layer 60 and the seventh insulating layer 70 may include an inorganic material or an organic material. For example, each of the sixth insulating layer 60 and the seventh insulating layer 70 may include, but is not limited to, a general purpose polymer, such as Polystyrene (PS), benzocyclobutene (BCB), hexamethyldisiloxane (HMDSO), Polymethylmethacrylate (PMMA), a polymer derivative having a phenolic group, an acrylic-based polymer, an imide-based polymer, such as polyimide, an aryl ether-based polymer, an amide-based polymer, a fluorine-based polymer, a p-xylene-based polymer, a vynyl alcohol-based polymer, or a blend thereof.

The element layer 130 including the light emitting element ED may be disposed on the circuit layer 120. The light emitting element ED may include a pixel electrode AE (or, an anode), a first functional layer HFL, an emissive layer EL, a second functional layer EFL, and a common electrode CE (or, a cathode). The first functional layer HFL, the second functional layer EFL, and the common electrode CE may be provided in common to the pixels.

The pixel electrode AE may be disposed on the seventh insulating layer 70. The pixel electrode AE may be connected to the second connecting electrode CNE20 through a third contact hole CH3 penetrating the seventh insulating layer 70. The pixel electrode AE may be a transflective electrode, a transmissive electrode, or a reflective electrode. In an embodiment, the pixel electrode AE may include a reflective layer formed of silver, magnesium, aluminum, platinum, palladium, gold, nickel, neodymium, iridium, chromium, or a compound thereof and a transparent or translucent electrode layer formed on the reflective layer. The transparent or translucent electrode layer may include at least one selected from the group consisting of indium tin oxide, indium zinc oxide, indium gallium zinc oxide, zinc oxide, indium oxide and aluminum-doped zinc oxide. For example, the pixel electrode AE may include a multi-layer structure in which indium tin oxide, silver, and indium tin oxide are sequentially stacked.

A pixel defining layer PDL may be disposed on the seventh insulating layer 70. A pixel defining opening PDLop for exposing a portion of the pixel electrode AE may be defined in the pixel defining layer PDL. That is, the pixel defining layer PDL may cover the periphery of the pixel electrode AE. Emissive regions PXA may be defined by pixel defining openings PDLop defined in the pixel defining layer PDL. For example, one emissive region PXA may be defined for the light emitting element ED.

The pixel defining layer PDL may have a property of absorbing light. For example, the pixel defining layer PDL may be black in color. The pixel defining layer PDL may include a black coloring agent. The black coloring agent may include a black dye or a black pigment. The black coloring agent may include carbon black, metal such as chromium, or oxide of the metal.

A first spacer HSPC may be disposed on the pixel defining layer PDL. A first protruding spacer SPC may be disposed on the first spacer HSPC. The first spacer HSPC and the first protruding spacer SPC may be integrally formed with each other and may be formed of the same material. For example, the first spacer HSPC and the first protruding spacer SPC may be formed through the same process by a half-tone mask. However, the present disclosure is not limited thereto. For example, the first spacer HSPC and the first protruding spacer SPC may include different materials and may be formed by separate processes.

The first functional layer HFL may be disposed on the pixel electrode AE, the pixel defining layer PDL, the first spacer HSPC, and the first protruding spacer SPC. The first functional layer HFL may include a hole transport layer (HTL), may include a hole injection layer (HIL), or may include both the hole transport layer and the hole injection layer.

The emissive layer EL may be disposed on the first functional layer HFL and may be disposed in a region corresponding to the pixel defining opening PDLop of the pixel defining layer PDL. The emissive layer EL may include an organic material, an inorganic material, or an organic-inorganic material that emits light having a certain color. The second functional layer EFL may be disposed over the first functional layer HFL and may cover the emissive layer EL. The second functional layer EFL may include an electron transport layer (ETL), may include an electron injection layer (EIL), or may include both the electron transport layer and the electron injection layer. The common electrode CE may be disposed on the second functional layer EFL.

The element layer 130 may further include a capping layer CPL disposed on the common electrode CE. The capping layer CPL may serve to increase light emission efficiency by the principle of constructive interference. The capping layer CPL may include, for example, a material having a refractive index of 1.6 or more for light having a wavelength of 589 nm. The capping layer CPL may be an organic capping layer including an organic material, an inorganic capping layer including an inorganic material, or a composite capping layer including an organic material and an inorganic material. For example, the capping layer CPL may include a carbocyclic compound, a heterocyclic compound, an amine group-containing compound, a porphine derivative, a phthalocyanine derivative, a naphthalocyanine derivative, an alkali metal complex, an alkaline earth metal complex, or a combination thereof. A substituent including O, N, S, Se, Si, F, Cl, Br, I, or a combination thereof may be selectively substituted for the carbocyclic compound, the heterocyclic compound, and the amine group-containing compound.

The encapsulation layer 140 may be disposed on the element layer 130. The encapsulation layer 140 may include an inorganic layer 141, an organic layer 142, and an inorganic layer 143 sequentially stacked. However, layers constituting the encapsulation layer 140 are not limited thereto.

The inorganic layers 141 and 143 may protect the element layer 130 from moisture and oxygen, and the organic layer 142 may protect the element layer 130 from foreign matter such as dust particles. The inorganic layers 141 and 143 may include a silicon nitride layer, a silicon oxy nitride layer, a silicon oxide layer, a titanium oxide layer, or an aluminum oxide layer. The organic layer 142 may include an acrylic organic layer, but is not limited thereto.

The sensor 200 may be disposed on the display panel 100. The sensor 200 may be referred to as the sensor layer, the input sensing layer, or the input sensing panel. The sensor 200 may include a sensor base layer 210, a first sensor conductive layer 220, a sensor insulating layer 230, a second sensor conductive layer 240, and a sensor cover layer 250.

The sensor base layer 210 may be directly disposed on the display panel 100. The sensor base layer 210 may be an inorganic layer including at least one of silicon nitride, silicon oxy nitride, and silicon oxide. Alternatively, the sensor base layer 210 may be an organic layer including an epoxy-based resin, an acrylic-based resin, or an imide-based resin. The sensor base layer 210 may have a single-layer structure, or may have a multi-layer structure stacked in the third direction DR3.

Each of the first sensor conductive layer 220 and the second sensor conductive layer 240 may have a single-layer structure, or may have a multi-layer structure stacked in the third direction DR3.

A conductive layer having a single-layer structure may include a metal layer or a transparent conductive layer. The metal layer may include molybdenum (Mo), silver (Ag), titanium (Ti), copper (Cu), aluminum (Al), or an alloy thereof. The transparent conductive layer may include transparent conductive oxide such as indium tin oxide, indium zinc oxide, zinc oxide, or indium zinc tin oxide. In addition, the transparent conductive layer may include a conductive polymer such as poly(3,4-ethylenedioxythiophene) (PEDOT), a metal nano wire, or graphene.

A conductive layer having a multi-layer structure may include metal layers. The meal layers may have, for example, a three-layer structure of titanium/aluminum/titanium. The conductive layer having the multi-layer structure may include at least one metal layer and at least one transparent conductive layer.

The sensor insulating layer 230 may be disposed between the first sensor conductive layer 220 and the second sensor conductive layer 240. The sensor insulating layer 230 may include an inorganic film. The inorganic film may include at least one of aluminum oxide, titanium oxide, silicon oxide, silicon nitride, silicon oxy nitride, zirconium oxide, and hafnium oxide.

Alternatively, the sensor insulating layer 230 may include an organic film. The organic film may include at least one of an acrylic-based resin, a methacrylic-based resin, a polyisoprene-based resin, a vinyl-based resin, an epoxy-based resin, a urethane-based resin, a celluosic-based resin, a siloxane-based resin, a polyimide-based resin, a polyamide-based resin, and a perylene-based resin.

The sensor cover layer 250 may be disposed on the sensor insulating layer 230 and may cover the second sensor conductive layer 240. The second sensor conductive layer 240 may include a conductive pattern. The sensor cover layer 250 may cover the conductive pattern and may reduce or eliminate a probability of damage to the conductive pattern in a subsequent process. The sensor cover layer 250 may include an inorganic material. For example, the sensor cover layer 250 may include silicon nitride, but is not limited thereto. In an embodiment of the present disclosure, the sensor cover layer 250 may be omitted.

The anti-reflection layer 300 may be disposed on the sensor 200. The anti-reflection layer 300 may include a dividing layer 310, a plurality of color filters 320, and a planarization layer 330.

The dividing layer 310 may be disposed to overlap the conductive pattern of the second sensor conductive layer 240. The sensor cover layer 250 may be disposed between the dividing layer 310 and the second sensor conductive layer 240. The dividing layer 310 may prevent reflection of external light by the second sensor conductive layer 240. The material constituting the dividing layer 310 is a material that absorbs light. The dividing layer 310 may be a black layer. In an embodiment, the dividing layer 310 may include a black coloring agent. The black coloring agent may include a black dye or a black pigment. The black coloring agent may include carbon black, metal such as chromium, or oxide of the metal.

The dividing layer 310 may have a plurality of dividing openings 310*op* defined therein. The dividing openings 310*op* may overlap a plurality of emissive layers EL, respectively. The color filters 320 may be disposed to correspond to the dividing openings 310*op*. The color filters 320 may transmit light provided from the emissive layers EL overlapping the color filters 320.

The planarization layer 330 may cover the dividing layer 310 and the color filters 320. The planarization layer 330 may include an organic material and may provide a flat surface on the upper surface of the planarization layer 330. In an embodiment, the planarization layer 330 is omitted.

In an embodiment of the present disclosure, the anti-reflection layer 300 includes a reflection control layer instead of the color filters 320. For example, the color filters 320 may be omitted in FIG. 6, and the reflection control layer may be added at the places where the color filters 320 are omitted. The reflection control layer may selectively absorb light from a partial band of light reflected inside the display panel and/or the electronic device or light from a partial band of light incident from outside the display panel and/or the electronic device.

For example, the reflection control layer may absorb light in a first wavelength range of 490 nm to 505 nm and light in a second wavelength range of 585 nm to 600 nm, and thus the light transmittance in the first wavelength range and the second wavelength range may be 40% or less. The reflection control layer may absorb light outside the wavelength ranges of red light, green light, and blue light emitted from the emissive layers EL. Since the reflection control layer absorbs light outside the wavelength ranges of the red light, the green light, or the blue light emitted from the emissive layers EL as described above, a decrease in the luminance of the display panel and/or the electronic device may be prevented or minimized. In addition, deterioration in the light emission efficiency of the display panel and/or the electronic device may be prevented or minimized, and visibility may be increased.

The reflection control layer may be implemented with an organic layer including a dye, a pigment, or a combination thereof. The reflection control layer may include a tetraazaporphyrin (TAP)-based compound, a porphyrin-based compound, a metal porphyrin-based compound, an oxazine-based compound, a squarylium-based compound, a triarylmethane-based compound, a polymethine-based compound, an anthraquinone-based compound, a phthalocyanine-based compound, an azo-based compound, a perylene-based compound, a xanthene-based compound, a diimmonium-based compound, a dipyrromethene-based compound, a cyanine-based compound, and a combination thereof.

In an embodiment, the reflection control layer has a transmittance ranging from about 64% to about 72%. The transmittance of the reflection control layer may be adjusted depending on the content of the pigment and/or dye included in the reflection control layer.

In an embodiment of the present disclosure, the anti-reflection layer 300 may include a phase retarder and/or a polarizer. The anti-reflection layer 300 may include at least a polarizer film. In this case, the anti-reflection layer 300 may be attached to the sensor 200 through an adhesive layer.

Figure 7:
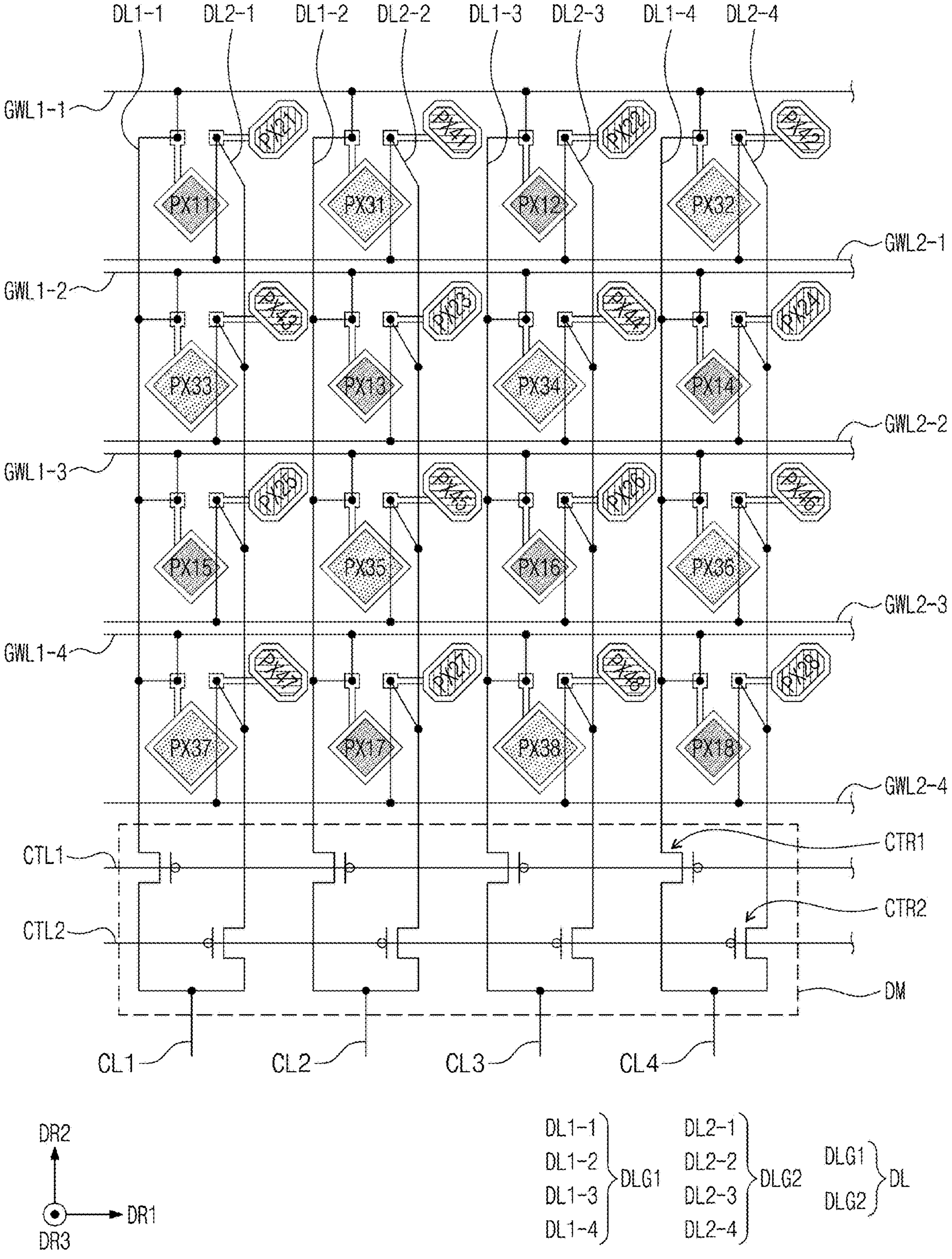
FIG. 7 is a view illustrating a portion of the display device according to an embodiment of the present disclosure.
Figure 8:
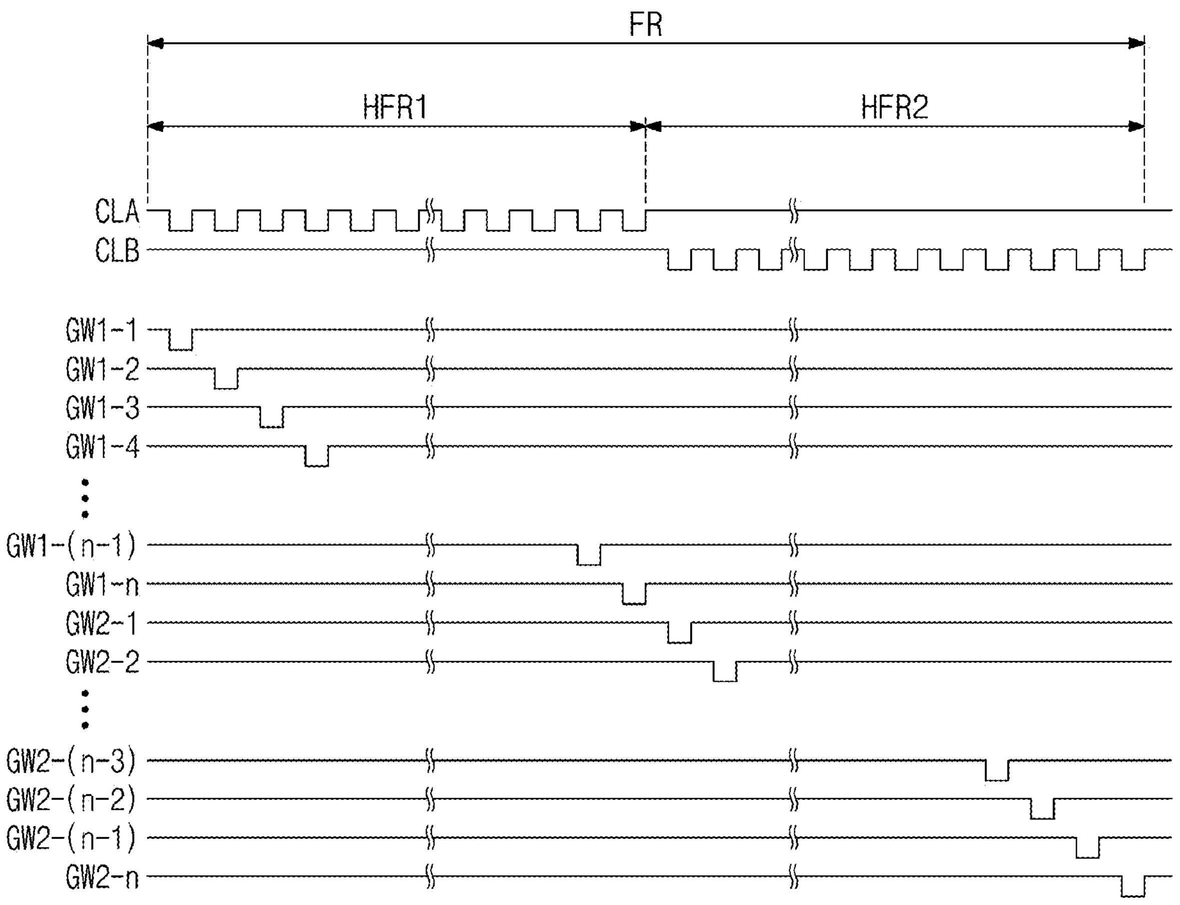
FIG. 8 is a timing chart for an operation of the display device according to an embodiment of the present disclosure.
Figure 9A:
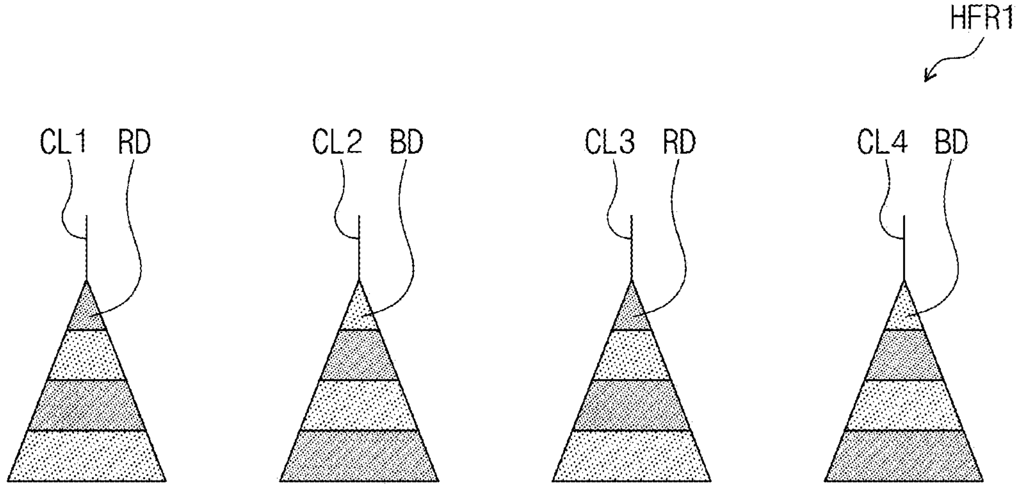
FIG. 9A is a view for an operation of the display device according to an embodiment of the present disclosure.
Figure 9B:
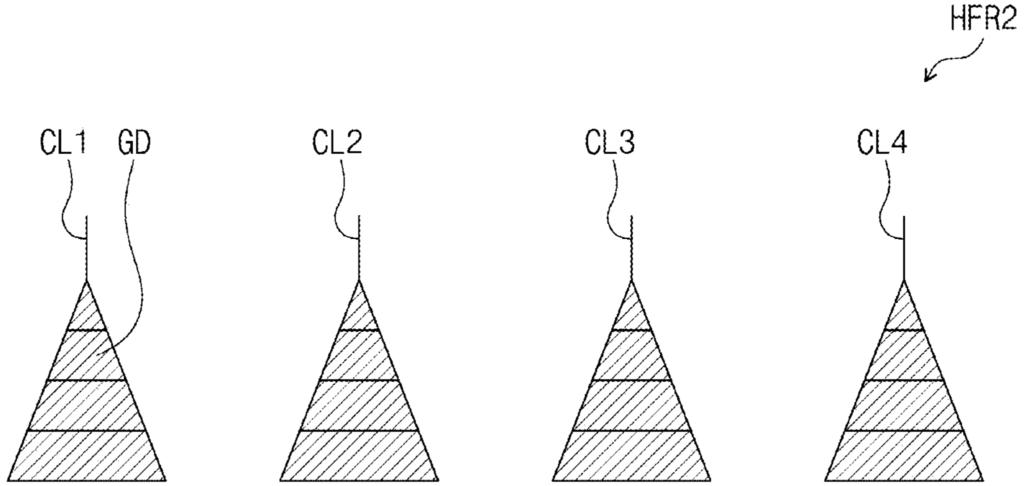
FIG. 9B is a view for an operation of the display device according to an embodiment of the present disclosure.

FIG. 7 is a view illustrating a portion of the display device according to an embodiment of the present disclosure. FIG. 8 is a timing chart for an operation of the display device according to an embodiment of the present disclosure. FIG. 9A is a view for an operation of the display device according to an embodiment of the present disclosure. FIG. 9B is a view for an operation of the display device according to an embodiment of the present disclosure.

Referring to FIG. 7, four first gate lines GWL1-1, GWL1-2, GWL1-3, and GWL1-4, four second gate lines GWL2-1, GWL2-2, GWL2-3, and GWL2-4, eight data lines DL, and 32 pixels PX11 to PX18, PX21 to PX28, PX31 to PX38, and PX41 to PX48 are illustrated as an example.

The plurality of pixels PX11 to PX18, PX21 to PX28, PX31 to PX38, and PX41 to PX48 may include the first pixels PX11, PX12, PX13, PX14, PX15, PX16, PX17, and PX18, the second pixels PX21, PX22, PX23, PX24, PX25, PX26, PX27, and PX28, the third pixels PX31, PX32, PX33, PX34, PX35, PX36, PX37, and PX38, and the fourth pixels PX41, PX42, PX43, PX44, PX45, PX46, PX47, and PX48.

Each of the first pixels PX11 to PX18 may include a first emissive region that outputs light having a first color. Each of the second pixels PX21 to PX28 may include a second emissive region that outputs light having a second color different from the first color. Each of the third pixels PX31 to PX38 may include a third emissive region that outputs light having a third color different from the first color and the second color. Each of the fourth pixels PX41 to PX48 may include a fourth emissive region that outputs light having the second color. The first color may be red, the second color may be green, and the third color may be blue.

In FIG. 7, dot hatching or diagonal hatching is present in each of the first to fourth emissive regions. In an embodiment, the shapes of the second emissive regions of the second pixels PX21 to PX28 are symmetrical to the shapes of the fourth emissive regions of the fourth pixels PX41 to PX48.

In an embodiment of the present disclosure, the first emissive regions and the third emissive regions alternate with one another in the first direction DR1 and the second direction DR2. The second emissive regions and the fourth emissive regions may alternate with one another in the first direction DR1 and the second direction DR2. For example, each of the second emissive regions may be disposed in a region defined by two first emissive regions and two third emissive regions adjacent to each other.

Each of the plurality of pixels PX11 to PX18, PX21 to PX28, PX31 to PX38, and PX41 to PX48 may be electrically connected to a corresponding one of the first gate lines GWL1-1, GWL1-2, GWL1-3, and GWL1-4 and the second gate lines GWL2-1, GWL2-2, GWL2-3, and GWL2-4 and a corresponding one of the data lines DL.

The data lines DL may include a first group DLG1 and a second group DLG2. For example, when a data signal is provided to the first group DLG1, the data signal is not provided to the second group DLG2. In addition, when a data signal is provided to the second group DLG2, the data signal is not provided to the first group DLG1.

In FIG. 7, four first group data lines DL1-1, DL1-2, DL1-3, and DL1-4 included in the first group DLG1 and four second group data lines DL2-1, DL2-2, DL2-3, and DL2-4 included in the second group DLG2 are illustrated as an example. The first group data lines DL1-1, DL1-2, DL1-3, and DL1-4 and the second group data lines DL2-1, DL2-2, DL2-3, and DL2-4 may alternate with one another. For example, the first group DLG1 may include odd data lines and the second group DLG2 may include even data lines.

The first group data lines DL1-1, DL1-2, DL1-3, and DL1-4 and the second group data lines DL2-1, DL2-2, DL2-3, and DL2-4 may be connected to the demultiplexer DM. For example, the demultiplexer DM may include a plurality of first control transistors CTR1 connected to the first group data lines DL1-1, DL1-2, DL1-3, and DL1-4 in a one-to-one correspondence and a plurality of second control transistors CTR2 connected to the second group data lines DL21-1, DL2-2, DL2-3, and DL2-4 in a one-to-one correspondence.

Referring to FIGS. 7 and 8, the first control transistors CTR1 may be controlled by a first control signal CLA provided through a first control line CTL1, and the second control transistors CTR2 may be controlled by a second control signal CLB provided through a second control line CTL2.

In an embodiment of the present disclosure, the first gate lines GWL1-1, GWL1-2, GWL1-3, and GWL1-4 and the second gate lines GWL2-1, GWL2-2, GWL2-3, and GWL2-4 may alternate with one another in the second direction DR2. Hereinafter, pixels between one first gate line (e.g., the first gate line GWL1-1) and one second gate line (e.g., the second gate line GWL2-1) are defined as one pixel row. Accordingly, it may be understood that four pixel rows are illustrated in FIG. 7. Each of the pixels arranged in each pixel row may be electrically connected to the first gate line or the second gate line spaced apart from each other with the pixel row therebetween.

The first pixel PX11, the second pixel PX21, the third pixel PX31, the fourth pixel PX41, the first pixel PX12, the second pixel PX22, the third pixel PX32, and the fourth pixel PX42 may be arranged in the first pixel row. The third pixel PX33, the fourth pixel PX43, the first pixel PX13, the second pixel PX23, the third pixel PX34, the fourth pixel PX44, the first pixel PX14, and the second pixel PX24 may be arranged in the second pixel row. The first pixel PX15, the second pixel PX25, the third pixel PX35, the fourth pixel PX45, the first pixel PX16, the second pixel PX26, the third pixel PX36, and the fourth pixel PX46 may be arranged in the third pixel row. The third pixel PX37, the fourth pixel PX47, the first pixel PX17, the second pixel PX27, the third pixel PX38, the fourth pixel PX48, the first pixel PX18, and the second pixel PX28 may be arranged in the fourth pixel row.

In an embodiment of the present disclosure, the plurality of pixels PX11 to PX18, PX21 to PX28, PX31 to PX38, and PX41 to PX48 are divided into a plurality of first group pixels PX11 to PX18 and PX31 to PX38 connected to the first group data lines DL1-1, DL1-2, DL1-3, and DL1-4 and a plurality of second group pixels PX21 to PX28 and PX41 to PX48 connected to the second group data lines DL2-1, DL2-2, DL2-3, and DL2-4. The plurality of first group pixels PX11 to PX18 and PX31 to PX38 may be referred to as a plurality of first pixels, and the first group data lines DL1-1, DL1-2, DL1-3, and DL1-4 may be referred to a plurality of first data lines. The plurality of second group pixels PX21 to PX28 and PX41 to PX48 may be referred to as a plurality of second pixels, and the second group data lines DL2-1, DL2-2, DL2-3, and DL2-4 may be referred to as a plurality of second data lines.

In an embodiment of the present disclosure, the first group pixels PX11 to PX18 and PX31 to PX38 may include the first pixels PX11 to PX18 and the third pixels PX31 to PX38. The second group pixels PX21 to PX28 and PX41 to PX48 include the second pixels PX21 to PX28 and the fourth pixels PX41 to PX48. Each of the first pixels PX11 to PX18 and the third pixels PX31 to PX38 may be electrically connected to a corresponding first gate line among the first gate lines GWL1-1, GWL1-2, GWL1-3, and GWL1-4, and each of the second pixels PX21 to PX28 and the fourth pixels PX41 to PX48 may be electrically connected to a corresponding second gate line among the second gate lines GWL2-1, GWL2-2, GWL2-3, and GWL2-4.

The first group data lines DL1-1, DL1-2, DL1-3, and DL1-4 may be connected to the first pixels PX11 to PX18 and the third pixels PX31 to PX38, and the second group data lines DL2-1, DL2-2, DL2-3, and DL2-4 may be connected to the second pixels PX21 to PX28 and the fourth pixels PX41 to PX48. For example, the first pixels PX11 and PX15 and the third pixels PX33 and PX37 may be connected to the first group data line DL1-1, and the second pixels PX21 and PX25 and the fourth pixels PX43 and PX47 may be connected to the second group data line DL2-1. The contents of the remaining first and second group data lines not described may be understood with reference to the description of this paragraph and the illustration of FIG. 7.

Referring to FIGS. 7 and 8, in an embodiment, one frame period FR includes a first sub-frame period HFR1 and a second sub-frame period HFR2 continuous with the first sub-frame period HFR1. In an embodiment, the second sub-frame period HFR2 starts when the first sub-frame period HFR1 ends. Data corresponding to one complete image may be provided to the display panel in the one frame period FR. Accordingly, the first to fourth pixels PX11 to PX18, PX21 to PX28, PX31 to PX38, and PX41 to PX48 may all emit light in the one frame period FR.

According to an embodiment of the present disclosure, in the first sub-frame period HFR1, the first control signal CLA has activation levels and inactivation levels alternating with one another, and the second control signal CLB has an inactivation level. The activation levels may be low levels, and the inactivation levels may be high levels. In addition, in the first sub-frame period HFR1, the plurality of first gate lines GWL1-1, GWL1-2, GWL1-3, and GWL1-4 may be sequentially activated. For example, first scan signals GW1-1, GW1-2, GW1-3, GW1-4, . . . , GW1-($n$−1), and GW1-$n$ provided to the first gate lines GWL1-1 to GWL1-$n$ (refer to FIG. 4) may sequentially have an activation level (e.g., a low level). In the first sub-frame period HFR1, a data signal may be provided to the first group pixels PX11 to PX18 and PX31 to PX38 connected to the first group data lines DL1-1, DL1-2, DL1-3, and DL1-4 among the first to fourth pixels PX11 to PX18, PX21 to PX28, PX31 to PX38, and PX41 to PX48.

Referring to FIGS. 7, 8, and 9A together, in the first sub-frame period HFR1, the first to fourth channel lines CL1, CL2, CL3, and CL4 may be electrically connected to the first group data lines DL1-1, DL1-2, DL1-3, and DL1-4 through the first control transistors CTR1. In an embodiment, when the first gate lines GWL1-1, GWL1-2, GWL1-3, and GWL1-4 are activated, the first to fourth channel lines CL1, CL2, CL3, and CL4 transfer a first color data signal RD, a third color data signal BD, a first color data signal RD, and a third color data signal BD to the first group data lines DL1-1, DL1-2, DL1-3, and DL1-4, respectively.

For example, in the first sub-frame period HFR1, each of the first channel line CL1 and the third channel line CL3 may alternately output the first color data signal RD and the third color data signal BD, and each of the second channel line CL2 and the fourth channel line CL4 may alternately output the third color data signal BD and the first color data signal RD. That is, in the first sub-frame period HFR1, the display device DD (refer to FIG. 4) may display a first sub-image composed of the first color (or, red) and the third color (or, blue). For example, the first sub-image may be magenta based on the combination of the first and third colors. In an embodiment, color data signals of a second color (or, green) are not output in the first sub-frame period HFR1.

According to an embodiment of the present disclosure, as shown in FIG. 8, in the second sub-frame period HFR2, the first control signal CLA has an inactivation level (e.g., remains constant without toggling), and the second control signal CLB has activation levels and inactivation levels alternating with one another (e.g., toggles). In the second sub-frame period HFR2, the second gate lines GWL2-1, GWL2-2, GWL2-3, and GWL2-4 may be sequentially activated. For example, second scan signals GW2-1, GW2-2, . . . , GW2-($n$−3), GW2-($n$−2), GW2-($n$−1), and GW2-$n$ provided to the second gate lines GWL2-1 to GWL2-$n$ may sequentially have an activation level (e.g., a logic low level). In the second sub-frame period HFR2, a data signal is provided to the second group pixels PX21 to PX28 and PX41 to PX48 connected to the second group data lines DL2-1, DL2-2, DL2-3, and DL2-4 among the first to fourth pixels PX11 to PX18, PX21 to PX28, PX31 to PX38, and PX41 to PX48.

Referring to FIGS. 7, 8, and 9B together, in the second sub-frame period HFR2, the first to fourth channel lines CL1, CL2, CL3, and CL4 may be electrically connected to the second group data lines DL2-1, DL2-2, DL2-3, and DL2-4 through the second control transistors CTR2. Accordingly, when the second gate lines GWL2-1, GWL2-2, GWL2-3, and GWL2-4 are activated, the first to fourth channel lines CL1, CL2, CL3, and CLA transfer second color data signal GD (e.g., of a green color) to the second group data lines DL2-1, DL2-2, DL2-3, and DL2-4. For example, in the second sub-frame period HFR2, the first to fourth channel lines CL1, CL2, CL3, and CL4 output the second color data signal GD. That is, in the second sub-frame period HFR2, the display device DD (refer to FIG. 4) displays a second sub-image composed of the second color (or, green). In an embodiment, in the second sub-frame period HFR2, color data signals of the first and third colors are not output.

According to an embodiment of the present disclosure, in each of the first and second sub-frame periods HFR1 and HFR2, the first to fourth channel lines CL1, CL2, CL3, and CL4 may transfer a data signal to the first group data lines DL1-1, DL1-2, DL1-3, and DL1-4 through the first control transistors CTR1, or may transfer a data signal to the second group data lines DL2-1, DL2-2, DL2-3, and DL2-4 through the second control transistors CTR2.

That is, in one sub-frame period HFR1 or HFR2, only the first control transistors CTR1 may be activated, or only the second control transistors CTR2 may be activated. In this case, the different types of color data signals output in the one sub-frame period HFR1 or HFR2 may be reduced. For example, instead of outputting three different types of color data signals each sub-frame period, one sub-frame period may be used for outputting two different types and another sub-frame period may be used for outputting a single type of color data signal. The color data signals may include a data signal corresponding to red, a data signal corresponding to green, and a data signal corresponding to blue, but is not limited thereto. For example, the color data signals may include data signals corresponding to three colors different from red, green, and blue in an alternate embodiment.

Accordingly, charging and discharging operations based on a change in the types of color data signals may be reduced or eliminated, and thus the power consumption of the data drive circuit DDC (refer to FIG. 4) may be reduced. For example, an example of the change in the types of color data signals may include a change from a red data signal to a green data signal. For example, the change in type may be reduced by maintaining a blue data signal during the second sub-frame period.

FIG. 10 is a view for an operation of the display device according to an embodiment of the present disclosure.

Referring to FIGS. 7, 9A, 9B, and 10, levels of data voltages provided to the first to fourth channel lines CL1, CL2, CL3, and CL4 depending on patterns/images are briefly illustrated. In the table, the channel "Odd" corresponds to the first and third channel lines CL1 and CL3, and the channel "Even" corresponds to the second and fourth channel lines CL2 and CL4.

When a white pattern is displayed on the display device DD (refer to FIG. 4), the first to fourth pixels PX11 to PX18, PX21 to PX28, PX31 to PX38, and PX41 to PX48 all emit light in the first sub-frame period HFR1 and the second sub-frame period HFR2. For example, when the first pixels PX11 to PX18 display a grayscale of 255, a data voltage may be 3.9V. When the second and fourth pixels PX21 to PX28 and PX41 to PX48 display a grayscale of 255, a data voltage may be 3.8V, and when the third pixels PX31 to PX38 display a grayscale of 255, a data voltage may be 3.4V. Accordingly, in the first sub-frame period HFR1, the levels of the first to fourth channel lines CL1, CL2, CL3, and CL4 may be changed to 3.9V and 3.4V. In addition, in the second sub-frame period HFR2, the first to fourth channel lines CL1, CL2, CL3, and CL4 may be maintained at 3.8V.

When a red pattern is displayed in the display device DD, the first pixels PX11 to PX18 emit light, and the second to fourth pixels PX21 to PX28, PX31 to PX38, and PX41 to PX48 do not emit light. For example, when the second and fourth pixels PX21 to PX28 and PX41 to PX48 display a 0 grayscale, a data voltage may be 6.5V. When the third pixels PX31 to PX38 display a 0 grayscale, a data voltage may be 6.6V. For example, a pixel does not emit light when it receives a data voltage for displaying the 0 grayscale. In the first sub-frame period HFR1, the levels of the first to fourth channel lines CL1, CL2, CL3, and CL4 may be repeatedly changed to 3.9V and 6.6V or alternate between 3.9V and 6.6V. In the second sub-frame period HFR2, the first to fourth channel lines CL1, CL2, CL3, and CL4 may be maintained at 6.5V.

When a green pattern is displayed in the display device DD, the second and fourth pixels PX21 to PX28 and PX41 to PX48 emit light, and the first and third pixels PX11 to PX18 and PX31 to PX38 do not emit light. For example, when the first pixels PX11 to PX18 display a 0 grayscale, a data voltage may be 6.7V. In the first sub-frame period HFR1, the levels of the first to fourth channel lines CL1, CL2, CL3, and CL4 may be repeatedly changed to 6.7V and 6.6V or alternate between 6.7V and 6.6V. In the second sub-frame period HFR2, the first to fourth channel lines CL1, CL2, CL3, and CL4 may be maintained at 3.8V.

When a blue pattern is displayed in the display device DD, the third pixels PX31 to PX38 emit light, and the first, second, and fourth pixels PX11 to PX18, PX21 to PX28, and PX41 to PX48 do not emit light. In the first sub-frame period HFR1, the levels of the first to fourth channel lines CL1, CL2, CL3, and CL4 may be repeatedly changed to 3.4V and 6.7V or alternate between 3.4V and 6.7V. In the second sub-frame period HFR2, the first to fourth channel lines CL1, CL2, CL3, and CL4 may be maintained at 6.5V.

According to an embodiment of the present disclosure, toggling in which voltage changes occur are reduced or eliminated in the second sub-frame period HFR2. In addition, when the white and green patterns are displayed, toggling in the first sub-frame period HFR1 may only generate a certain voltage difference (e.g., 0.5V or 0.1V) due to a color difference. Accordingly, charging and discharging operations may be reduced, and thus the power consumption of the data drive circuit DDC (refer to FIG. 4) may be reduced.

Figure 11:
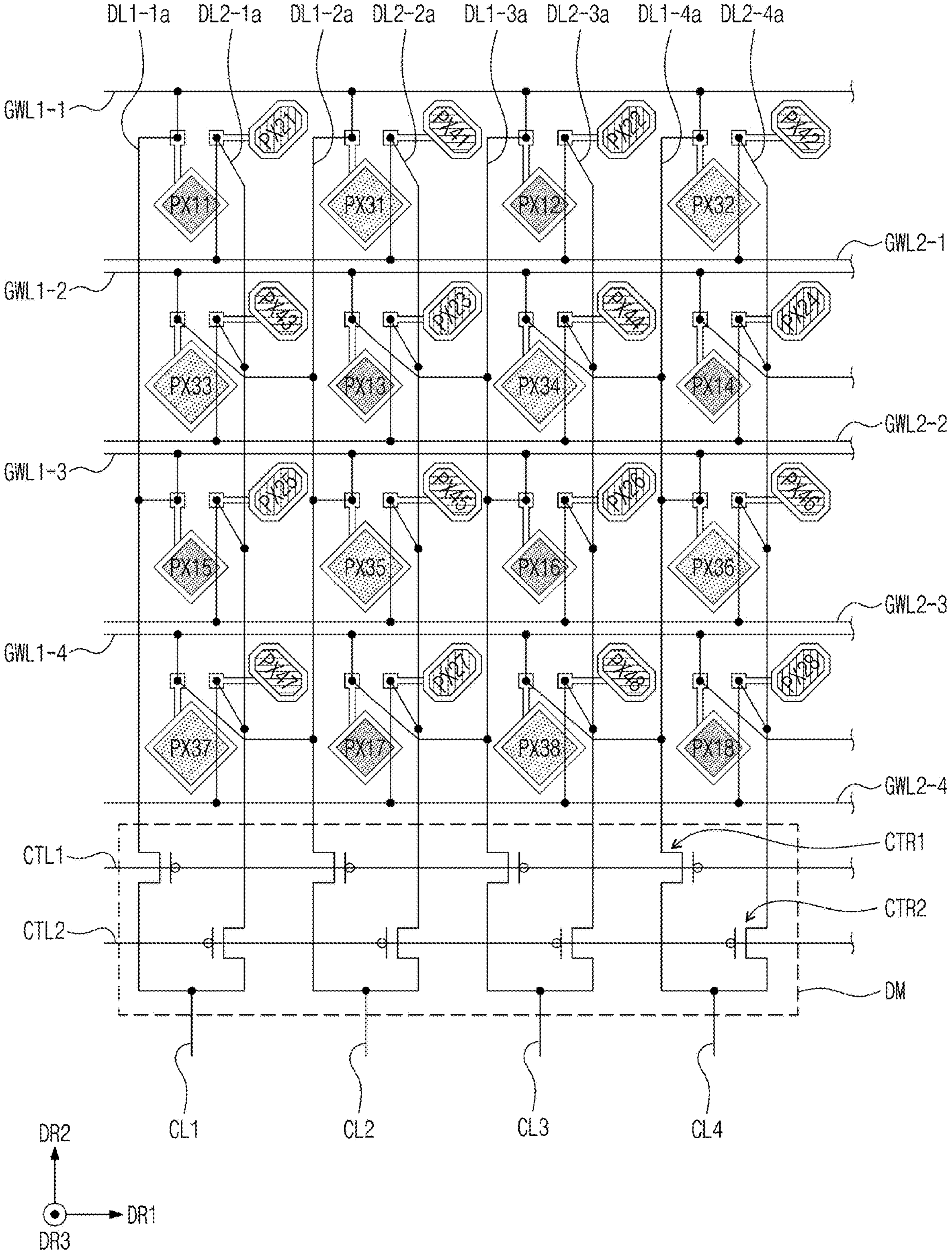
FIG. 11 is a view illustrating a portion of the display device according to an embodiment of the present disclosure.
Figure 12A:
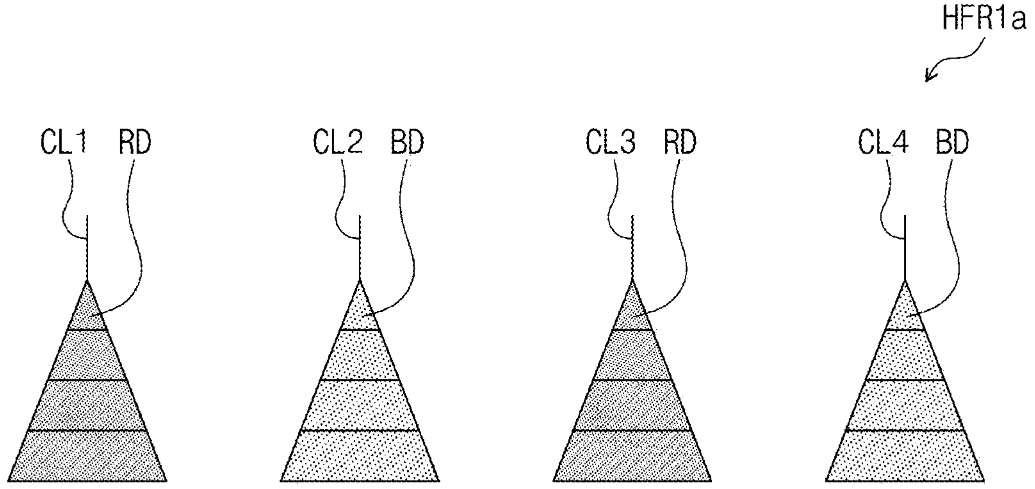
FIG. 12A is a view for an operation of the display device according to an embodiment of the present disclosure.
Figure 12B:
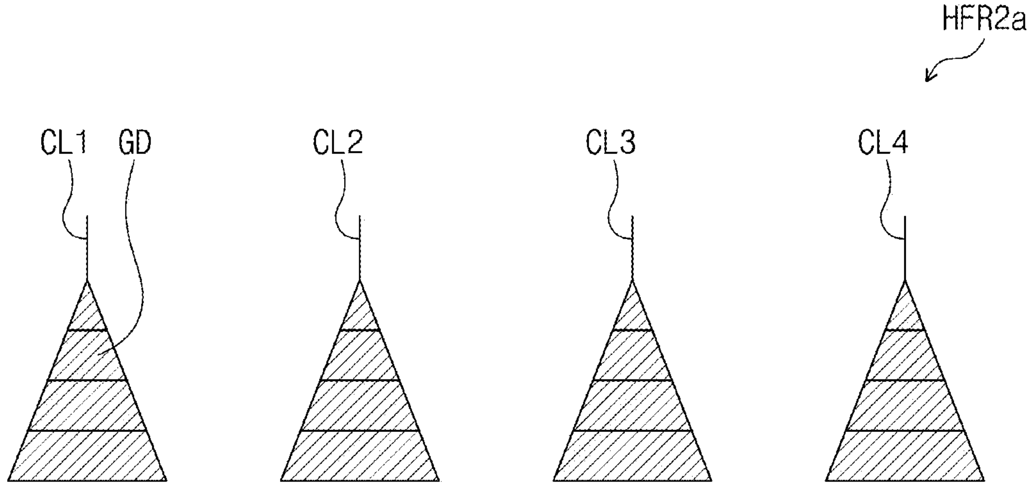
FIG. 12B is a view for an operation of the display device according to an embodiment of the present disclosure.

FIG. 11 is a view illustrating a portion of the display device according to an embodiment of the present disclosure. FIG. 12A is a view for an operation of the display device according to an embodiment of the present disclosure. FIG. 12B is a view for an operation of the display device according to an embodiment of the present disclosure.

Referring to FIG. 11, the plurality of pixels PX11 to PX18, PX21 to PX28, PX31 to PX38, and PX41 to PX48 are divided into the plurality of first group pixels PX11 to PX18 and PX31 to PX38 and the plurality of second group pixels PX21 to PX28 and PX41 to PX48. The first group pixels PX11 to PX18 and PX31 to PX38 may include the first pixels PX11 to PX18 and the third pixels PX31 to PX38. The second group pixels PX21 to PX28 and PX41 to PX48 include the second pixels PX21 to PX28 and the fourth pixels PX41 to PX48. Each of the first pixels PX11 to PX18 and the third pixels PX31 to PX38 may be electrically connected to a corresponding first gate line among the first gate lines GWL1-1, GWL1-2, GWL1-3, and GWL1-4, and each of the second pixels PX21 to PX28 and the fourth pixels PX41 to PX48 may be electrically connected to a corresponding second gate line among the second gate lines GWL2-1, GWL2-2, GWL2-3, and GWL2-4.

First group data lines DL1-1*a*, DL1-2*a*, DL1-3*a*, and DL1-4*a* may include first-first group data lines DL1-1*a* and DL1-3*a* connected to the first pixels PX11 to PX18 and first-second group data lines DL1-2*a* and DL1-4*a* connected to the third pixels PX31 to PX38.

For example, the first pixels PX11 and PX15 are connected to the first-first group data line DL1-1*a*, and the third pixels PX31, PX33, PX35, and PX37 are connected to the first-second group data line DL1-2*a*. The first pixels PX12, PX13, PX16, and PX17 are connected to the first-first group data line DL1-3*a*, and the third pixels PX32, PX34, PX36, and PX38 are connected to the first-second group data line DL1-4*a*.

The second pixels PX21 and PX25 and the fourth pixels PX43 and PX47 are connected to a second group data line DL2-1*a*. Second group data lines DL2-1*a*, DL2-2*a*, DL2-3*a*, and DL2-4*a* are connected to the second pixels PX21 to PX28 and the fourth pixels PX41 to PX48. The contents of the remaining second group data lines not described may be understood with reference to the description of this paragraph and the illustration of FIG. 11.

In an embodiment, the first-first group data line DL1-1*a*, the second group data line DL2-1*a*, the first-second group data line DL1-2*a*, the second group data line DL2-2*a*, the first-first group data line DL1-3*a*, the second group data line DL2-3*a*, the first-second group data line DL1-4*a*, and the second group data line DL2-4*a* are sequentially arranged in the first direction DR1.

Referring to FIGS. 11 and 12A, in a first sub-frame period HFR1*a*, the first to fourth channel lines CL1, CL2, CL3, and CL4 may be electrically connected to the first group data lines DL1-1*a*, DL1-2*a*, DL1-3*a*, and DL1-4*a* through the first control transistors CTR1. The first channel line CL1 and the third channel line CL3 may sequentially output a first color data signal RD, and the second channel line CL2 and the fourth channel line CL4 may sequentially output a third color data signal BD.

According to an embodiment of the present disclosure, in one sub-frame period, a data signal provided to pixels having the same color may be provided to the first to fourth channel lines CL1, CL2, CL3, and CL4. For example, according to an embodiment of the present disclosure, when the display device DD (refer to FIG. 4) displays a white or black pattern, a difference in gray voltage representing a 255 grayscale for each color and a difference in gray voltage representing a 0 grayscale for each color may be eliminated in each of the first to fourth channel lines CL1, CL2, CL3, and CL4. Accordingly, charging and discharging operations may be reduced, and thus the power consumption of the data drive circuit DDC (refer to FIG. 4) may be reduced.

Referring to FIGS. 11 and 12B, in a second sub-frame period HFR2*a*, the first to fourth channel lines CL1, CL2, CL3, and CL4 may be electrically connected to the second group data lines DL2-1*a*, DL2-2*a*, DL2-3*a*, and DL2-4*a* through the second control transistors CTR2. In the second sub-frame period HFR2*a*, the first to fourth channel lines CL1, CL2, CL3, and CL4 output a second color data signal GD. That is, in the second sub-frame period HFR2*a*, the display device DD displays a second sub-image composed of the second color (or, green). For example, the display device DD need not display an image composed of the first and third colors during the second sub-frame period HFR2*a*.

Figure 13:
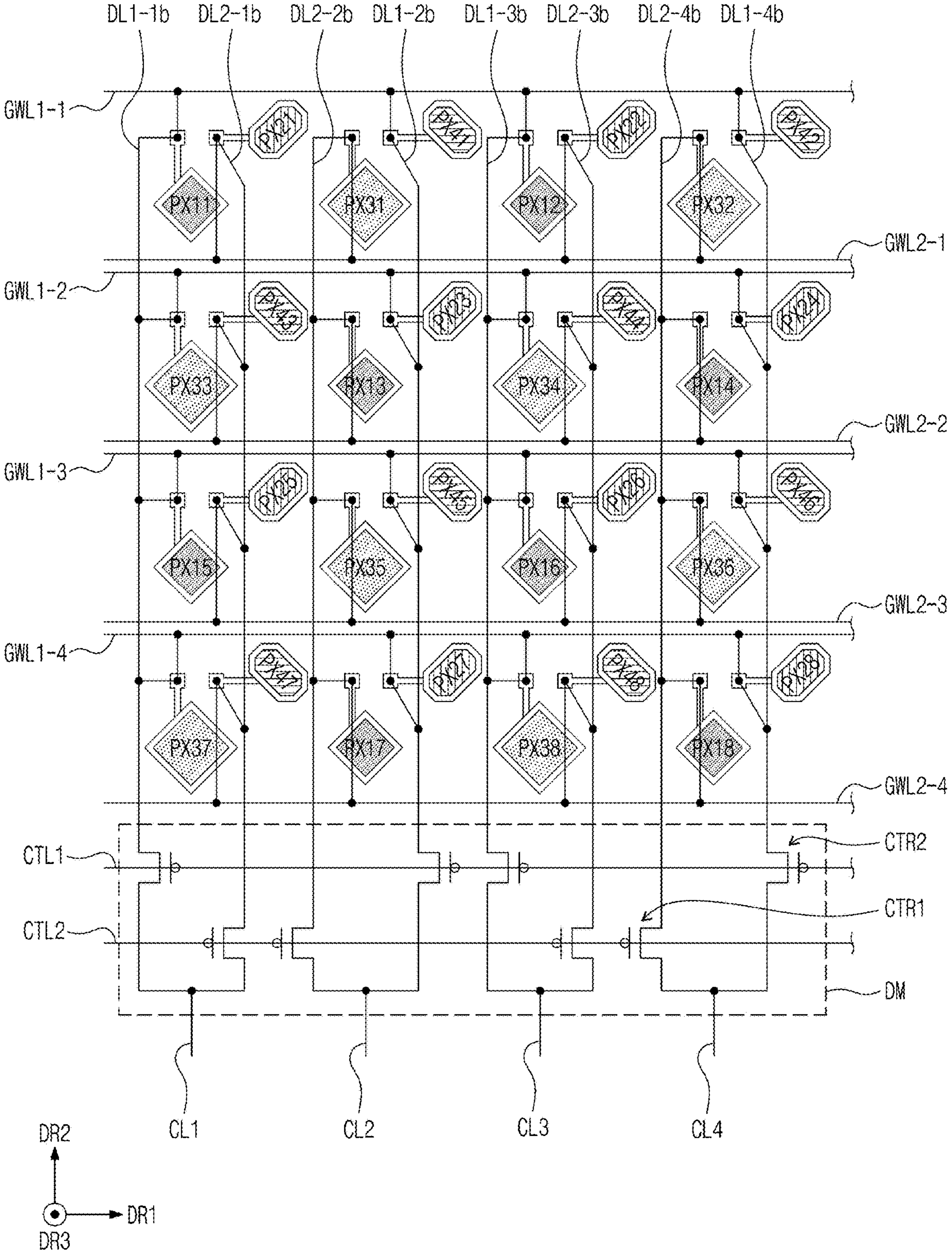
FIG. 13 is a view illustrating a portion of the display device according to an embodiment of the present disclosure.
Figure 14A:
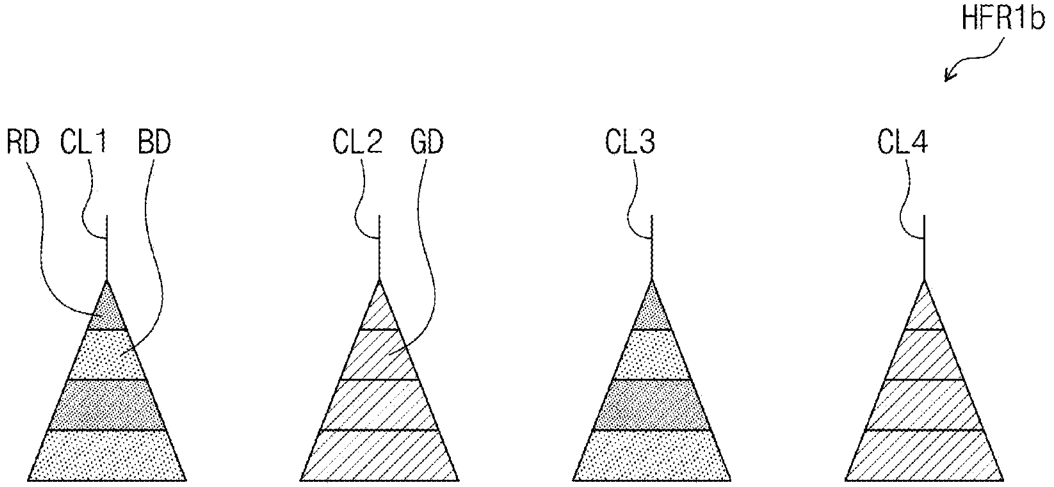
FIG. 14A is a view for an operation of the display device according to an embodiment of the present disclosure.
Figure 14B:
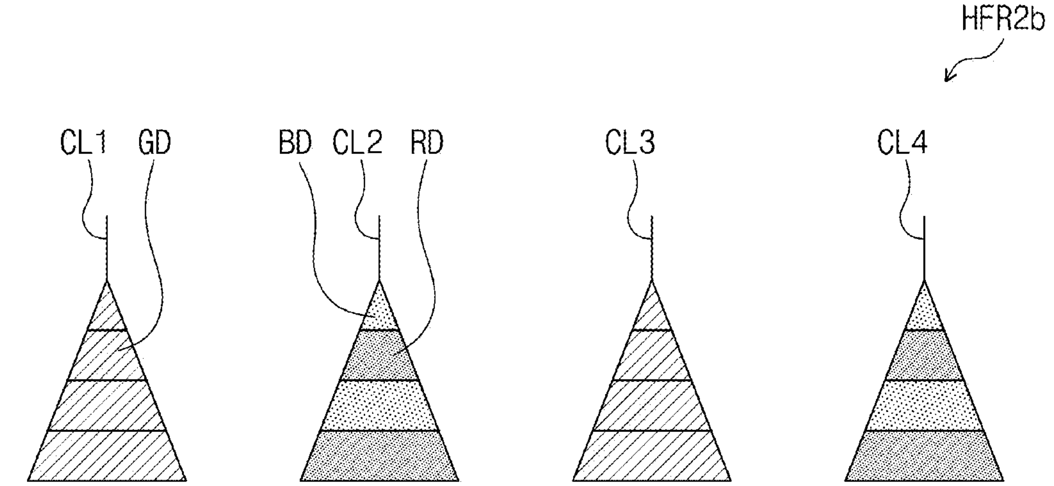
FIG. 14B is a view for an operation of the display device according to an embodiment of the present disclosure.

FIG. 13 is a view illustrating a portion of the display device according to an embodiment of the present disclosure. FIG. 14A is a view for an operation of the display device according to an embodiment of the present disclosure. FIG. 14B is a view for an operation of the display device according to an embodiment of the present disclosure.

Referring to FIG. 13, first group data lines DL1-1*b*, DL1-2*b*, DL1-3*b*, and DL1-4*b* include first-first group data lines DL1-1*b* and DL1-3*b* connected to the first pixels PX11, PX12, PX15, and PX16 and the third pixels PX33, PX34, PX37, and PX38 and first-second group data lines DL1-2*b* and DL1-4*b* connected to the second pixels PX23, PX24, PX27, and PX28 and the fourth pixels PX41, PX42, PX45, and PX46.

In an embodiment of the present disclosure, second group data lines DL2-1*b*, DL2-2*b*, DL2-3*b*, and DL2-4*b* include second-first group data lines DL2-1*b* and DL2-3*b* connected to the second pixels PX21, PX22, PX25, and PX26 and the fourth pixels PX43, PX44, PX47, and PX48 and second-second group data lines DL2-2*b* and DL2-4*b* connected to the first pixels PX13, PX14, PX17, and PX18 and the third pixels PX31, PX32, PX35, and PX36.

In an embodiment of the present disclosure, the first-first group data line DL1-1*b*, the second-first group data line DL2-1*b*, the second-second group data line DL2-2*b*, the first-second group data line DL1-2*b*, the first-first group data line DL1-3*b*, the second-first group data line DL2-3*b*, the second-second group data line DL2-4*b*, and the first-second group data line DL1-4*b* are sequentially arranged in the first direction DR1.

Referring to FIGS. 13 and 14A, in a first sub-frame period HFR1*b*, the first to fourth channel lines CL1, CL2, CL3, and CL4 may be electrically connected to the first group data lines DL1-1*b*, DL1-2*b*, DL1-3*b*, and DL1-4*b* through the first control transistors CTR1. A first color data signal RD and a third color data signal BD may be alternately output to the first channel line CL1 and the third channel line CL3, and a second color data signal GD may be sequentially output to the second channel line CL2 and the fourth channel line CLA. That is, in the first sub-frame period HFR1*b*, the display device DD (refer to FIG. 4) may display a first sub-image composed of the first color (or, red), the second color (or, green), and the third color (or, blue).

Referring to FIGS. 13 and 14B, in a second sub-frame period HFR2*b*, the first to fourth channel lines CL1, CL2, CL3, and CL4 may be electrically connected to the second group data lines DL2-1*b*, DL2-2*b*, DL2-3*b*, and DL2-4*b* through the second control transistors CTR2. A second color data signal GD may be sequentially output to the first channel line CL1 and the third channel line CL3, and a third color data signal BD and a first color data signal RD may be alternately output to the second channel line CL2 and the fourth channel line CL4. That is, in the second sub-frame period HFR2*b*, the display device DD (refer to FIG. 4) may display a second sub-image composed of the first color (or, red), the second color (or, green), and the third color (or, blue).

According to an embodiment, toggling of the channel lines to which the second color data signal GD is provided may be minimized in each of the first and second sub-frame periods HFR1*b* and HFR2*b*. In addition, even in the case of the channel lines to which the first color data signal RD and the third color data signal BD are provided, toggling in each of the first and second sub-frame periods HFR1*b* and HFR2*b* may only generate a certain voltage difference (e.g., 0.5V or 0.1V) due to a color difference when white and green patterns are displayed. Accordingly, charging and discharging operations may be reduced, and thus the power consumption of the data drive circuit DDC (refer to FIG. 4) may be reduced.

Furthermore, according to an embodiment of the present disclosure, a sub-image composed of the first color (or, red), the second color (or, green), and the third color (or, blue) may be displayed in each of the first and second sub-frame periods HFR1*b* and HFR2*b*. Accordingly, the probability of occurrence of a color break-up phenomenon in which a color difference between the first sub-frame period HFR1*b* and the second sub-frame period HFR2*b* is visible may be reduced or eliminated.

Figure 15:
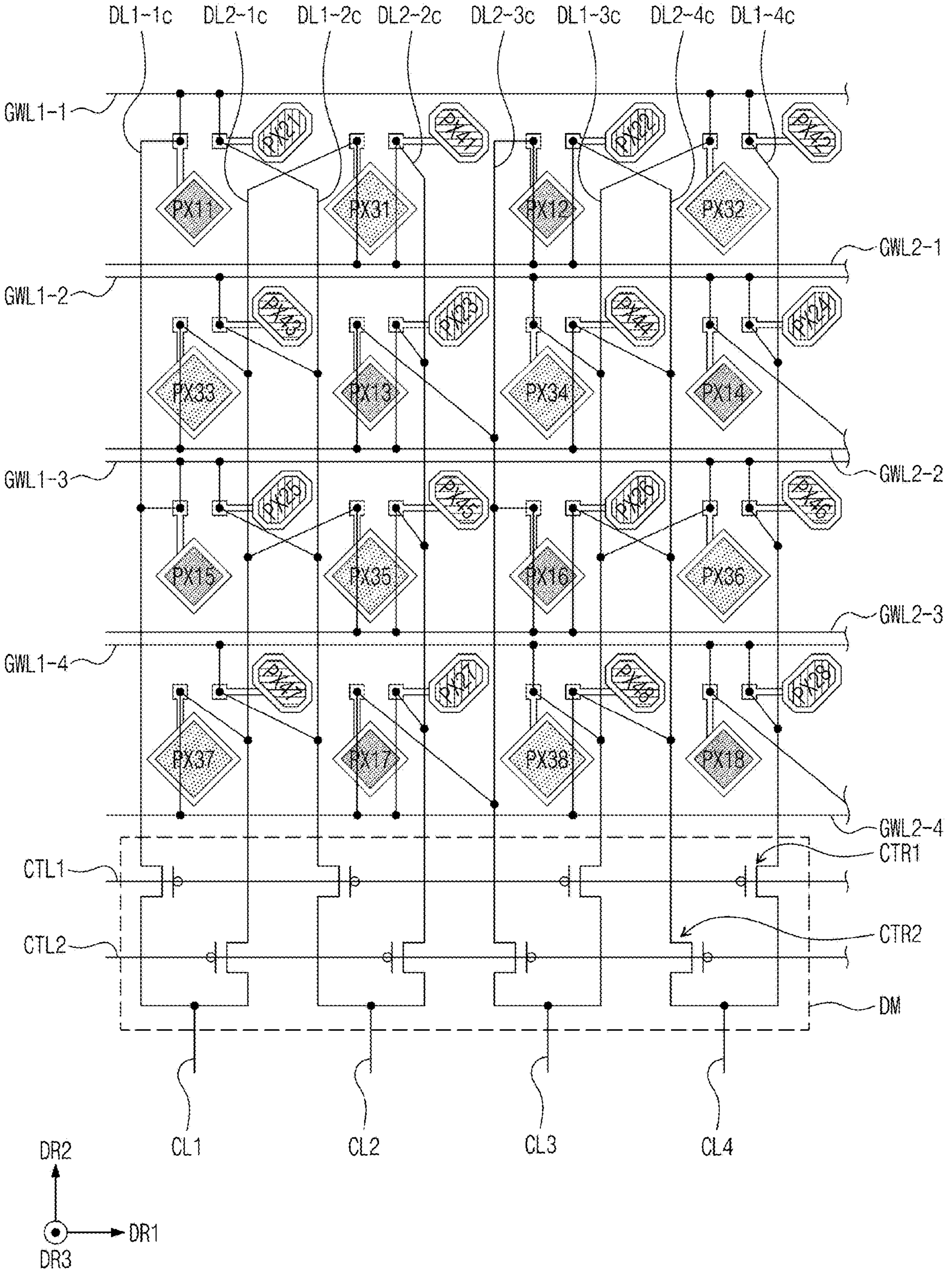
FIG. 15 is a view illustrating a portion of the display device according to an embodiment of the present disclosure.
Figure 16A:
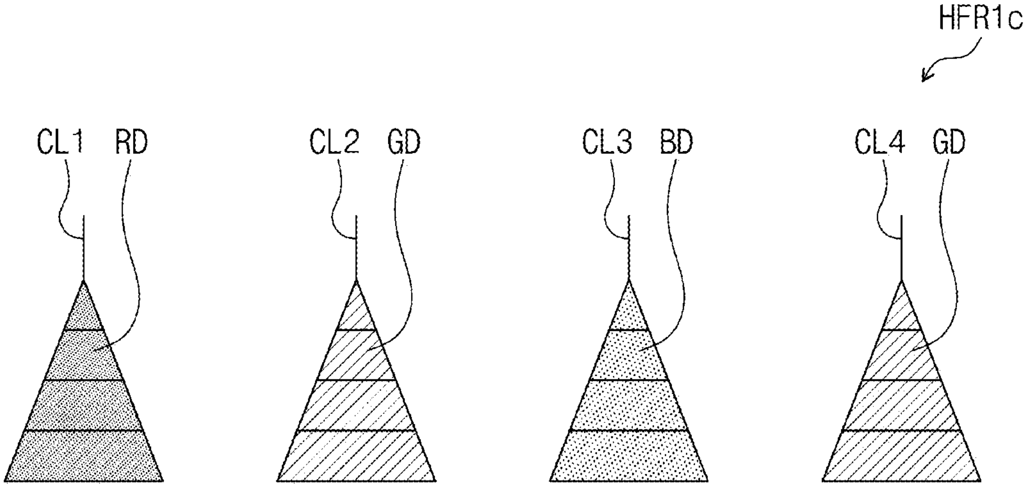
FIG. 16A is a view for an operation of the display device according to an embodiment of the present disclosure.
Figure 16B:
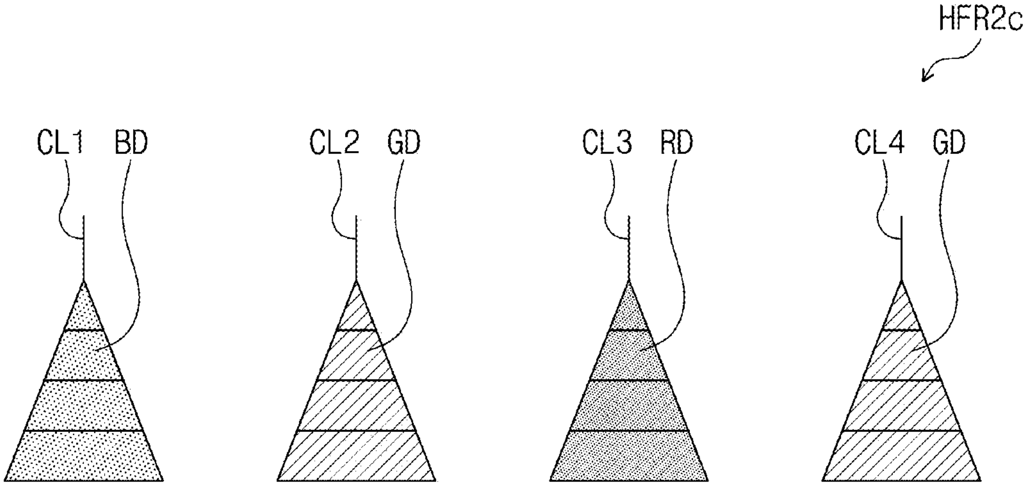
FIG. 16B is a view for an operation of the display device according to an embodiment of the present disclosure.

FIG. 15 is a view illustrating a portion of the display device according to an embodiment of the present disclosure. FIG. 16A is a view for an operation of the display device according to an embodiment of the present disclosure. FIG. 16B is a view for an operation of the display device according to an embodiment of the present disclosure.

Referring to FIG. 15, first group data lines DL1-1*c*, DL1-2*c*, DL1-3*c*, and DL1-4*c* include a first-first group data line DL1-1*c* connected to the first pixels PX11 and PX15, first-second group data lines DL1-2*c* and DL1-4*c* connected to the second pixels PX21, PX24, PX25, and PX28 and the fourth pixels PX42, PX43, PX46, and PX47, and a first-third group data line DL1-3*c* connected to the third pixels PX32, PX34, PX36, and PX38.

In an embodiment of the present disclosure, second group data lines DL2-1*c*, DL2-2*c*, DL2-3*c*, and DL2-4*c* include a second-first group data line DL2-1*c* connected to the third pixels PX31, PX33, PX35, and PX37, second-second group data lines DL2-2*c* and DL2-4*c* connected to the second pixels PX22, PX23, PX26, and PX27 and the fourth pixels PX41, PX44, PX45, and PX48, and a second-third group data line DL2-3*c* connected to the first pixels PX12, PX13, PX16, and PX17.

In an embodiment of the present disclosure, the first-first group data line DL1-1*c*, the second-first group data line DL2-1*c*, the first-second group data line DL1-2*c*, the second-second group data line DL2-2*c*, the second-third group data line DL2-3*c*, the first-third group data line DL1-3*c*, the second-second group data line DL2-4*c*, and the first-second group data line DL1-4*c* are sequentially arranged in the first direction DR1.

Referring to FIGS. 15 and 16A, in a first sub-frame period HFR1*c*, the first to fourth channel lines CL1, CL2, CL3, and CL4 may be electrically connected to the first group data lines DL1-1*c*, DL1-2*c*, DL1-3*c*, and DL1-4*c* through the first control transistors CTR1. In an embodiment, a first color data signal RD is sequentially output to the first channel line CL1, a second color data signal GD is sequentially output to the second and fourth channel lines CL2 and CL4, and a third color data signal BD is sequentially output to the third channel line CL3. That is, in the first sub-frame period HFR1*c*, the display device DD (refer to FIG. 4) may display a first sub-image composed of the first color (or, red), the second color (or, green), and the third color (or, blue).

Referring to FIGS. 15 and 16B, in a second sub-frame period HFR2*c*, the first to fourth channel lines CL1, CL2, CL3, and CL4 may be electrically connected to the second group data lines DL2-1*c*, DL2-2*c*, DL2-3*c*, and DL2-4*c* through the second control transistors CTR2. In an embodiment, a third color data signal BD is sequentially output to the first channel line CL1, a second color data signal GD is sequentially output to the second and fourth channel lines CL2 and CL4, and a first color data signal RD is sequentially output to the third channel line CL3. That is, in the second sub-frame period HFR2*c*, the display device DD (refer to FIG. 4) may display a second sub-image composed of the first color (or, red), the second color (or, green), and the third color (or, blue).

According to an embodiment of the present disclosure, in each of the first and second sub-frame periods HFR1*c* and HFR2*c*, a data signal provided to pixels having the same color is provided to a single channel line. Accordingly, charging and discharging operations depending on a change in the types of color data signals may be eliminated, and thus the power consumption of the data drive circuit DDC (refer to FIG. 4) may be reduced.

Further, according to an embodiment of the present disclosure, a sub-image composed of the first color (or, red), the second color (or, green), and the third color (or, blue) may be displayed in each of the first and second sub-frame periods HFR1*c* and HFR2*c*. Accordingly, the probability of occurrence of a color break-up phenomenon in which a color difference between the first sub-frame period HFR1*c* and the second sub-frame period HFR2*c* is visible may be reduced or eliminated.

Figure 17:
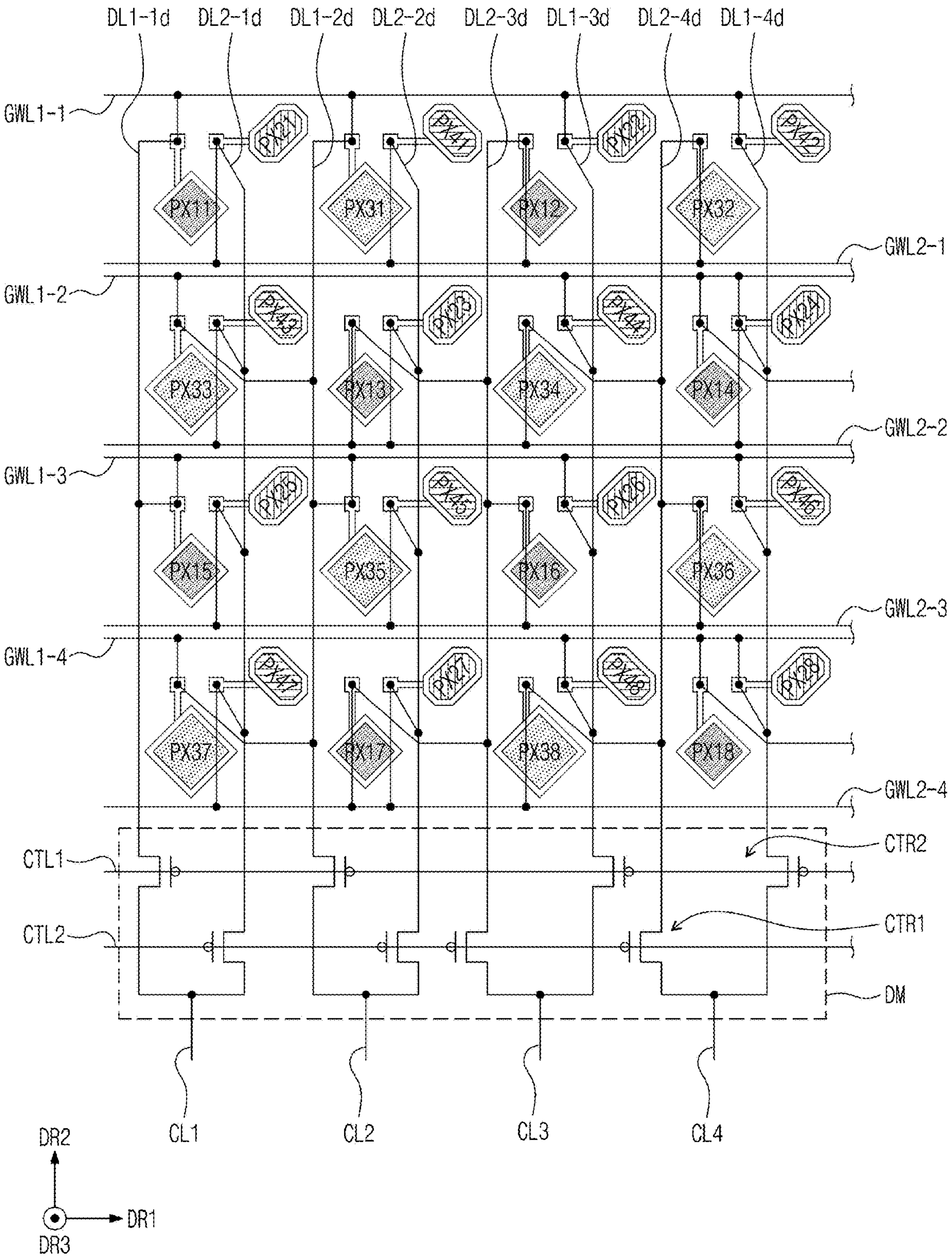
FIG. 17 is a view illustrating a portion of the display device according to an embodiment of the present disclosure.
Figure 18A:
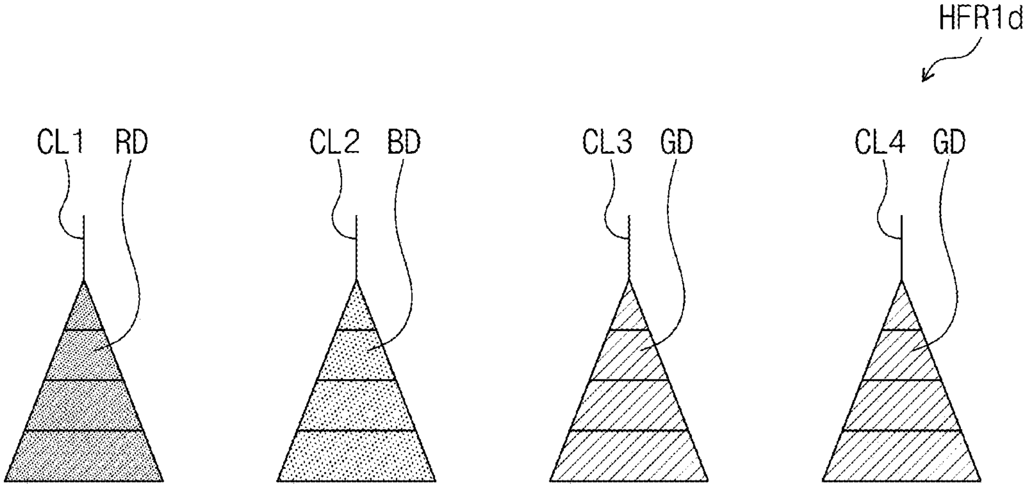
FIG. 18A is a view for an operation of the display device according to an embodiment of the present disclosure.
Figure 18B:
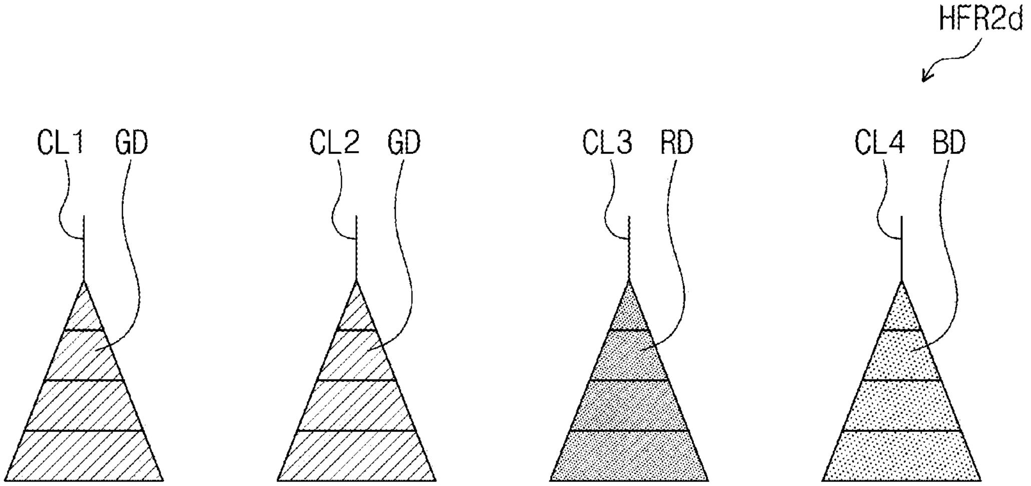
FIG. 18B is a view for an operation of the display device according to an embodiment of the present disclosure.

FIG. 17 is a view illustrating a portion of the display device according to an embodiment of the present disclosure. FIG. 18A is a view for an operation of the display device according to an embodiment of the present disclosure. FIG. 18B is a view for an operation of the display device according to an embodiment of the present disclosure.

Referring to FIG. 17, first group data lines DL1-1*d*, DL1-2*d*, DL1-3*d*, and DL1-4*d* include a first-first group data line DL1-1*d* connected to the first pixels PX11 and PX15, a first-second group data line DL1-2*d* connected to the third pixels PX31, PX33, PX35, and PX37, and first-third group data lines DL1-3*d* and DL1-4*d* connected to the second pixels PX22, PX24, PX26, and PX28 and the fourth pixels PX42, PX44, PX46, and PX48.

In an embodiment of the present disclosure, second group data lines DL2-1*d*, DL2-2*d*, DL2-3*d*, and DL2-4*d* include second-first group data lines DL2-1*d* and DL2-2*d* connected to the second pixels PX21, PX23, PX25, and PX27 and the fourth pixels PX41, PX42, PX45, and PX47, a second-second group data line DL2-3*d* connected to the first pixels PX12, PX13, PX16, and PX17, and a second-third group data line DL2-4*d* connected to the third pixels PX32, PX34, PX36, and PX38.

In an embodiment of the present disclosure, the first-first group data line DL1-1*d*, the second-first group data line DL2-1*d*, the first-second group data line DL1-2*d*, the second-first group data line DL2-2*d*, the second-second group data line DL2-3*d*, the first-third group data line DL1-3*d*, the second-third group data line DL2-4*d*, and the first-third group data line DL1-4*d* are sequentially arranged in the first direction DR1.

Referring to FIGS. 17 and 18A, in a first sub-frame period HFR1*d*, the first to fourth channel lines CL1, CL2, CL3, and CL4 may be electrically connected to the first group data lines DL1-1*d*, DL1-2*d*, DL1-3*d*, and DL1-4*d* through the first control transistors CTR1. A first color data signal RD is sequentially output to the first channel line CL1, a third color data signal BD is sequentially output to the second channel line CL2, and a second color data signal GD is sequentially output to the third and fourth channel lines CL3 and CL4. That is, in the first sub-frame period HFR1*d*, the display device DD (refer to FIG. 4) may display a first sub-image composed of the first color (or, red), the second color (or, green), and the third color (or, blue).

Referring to FIGS. 17 and 18B, in a second sub-frame period HFR2*d*, the first to fourth channel lines CL1, CL2, CL3, and CL4 may be electrically connected to the second group data lines DL2-1*d*, DL2-2*d*, DL2-3*d*, and DL2-4*d* through the second control transistors CTR2. A second color data signal GD is sequentially output to the first and second channel lines CL1 and CL2, a first color data signal RD is sequentially output to the third channel line CL3, and a third color data signal BD is sequentially output to the fourth channel line CL4. That is, in the second sub-frame period HFR2*d*, the display device DD (refer to FIG. 4) may display a second sub-image composed of the first color (or, red), the second color (or, green), and the third color (or, blue).

According to an embodiment of the present disclosure, in each of the first and second sub-frame periods HFR1*d* and HFR2*d*, a data signal provided to pixels having the same color is provided to a single channel line. Accordingly, charging and discharging operations depending on a change in the types of color data signals may be eliminated, and thus the power consumption of the data drive circuit DDC (refer to FIG. 4) may be reduced.

Further, according to an embodiment of the present disclosure, a sub-image composed of the first color (or, red), the second color (or, green), and the third color (or, blue) may be displayed in each of the first and second sub-frame periods HFR1*d* and HFR2*d*. Accordingly, the probability of occurrence of a color break-up phenomenon in which a color difference between the first sub-frame period HFR1*d* and the second sub-frame period HFR2*d* is visible may be reduced or eliminated.

Figure 19:
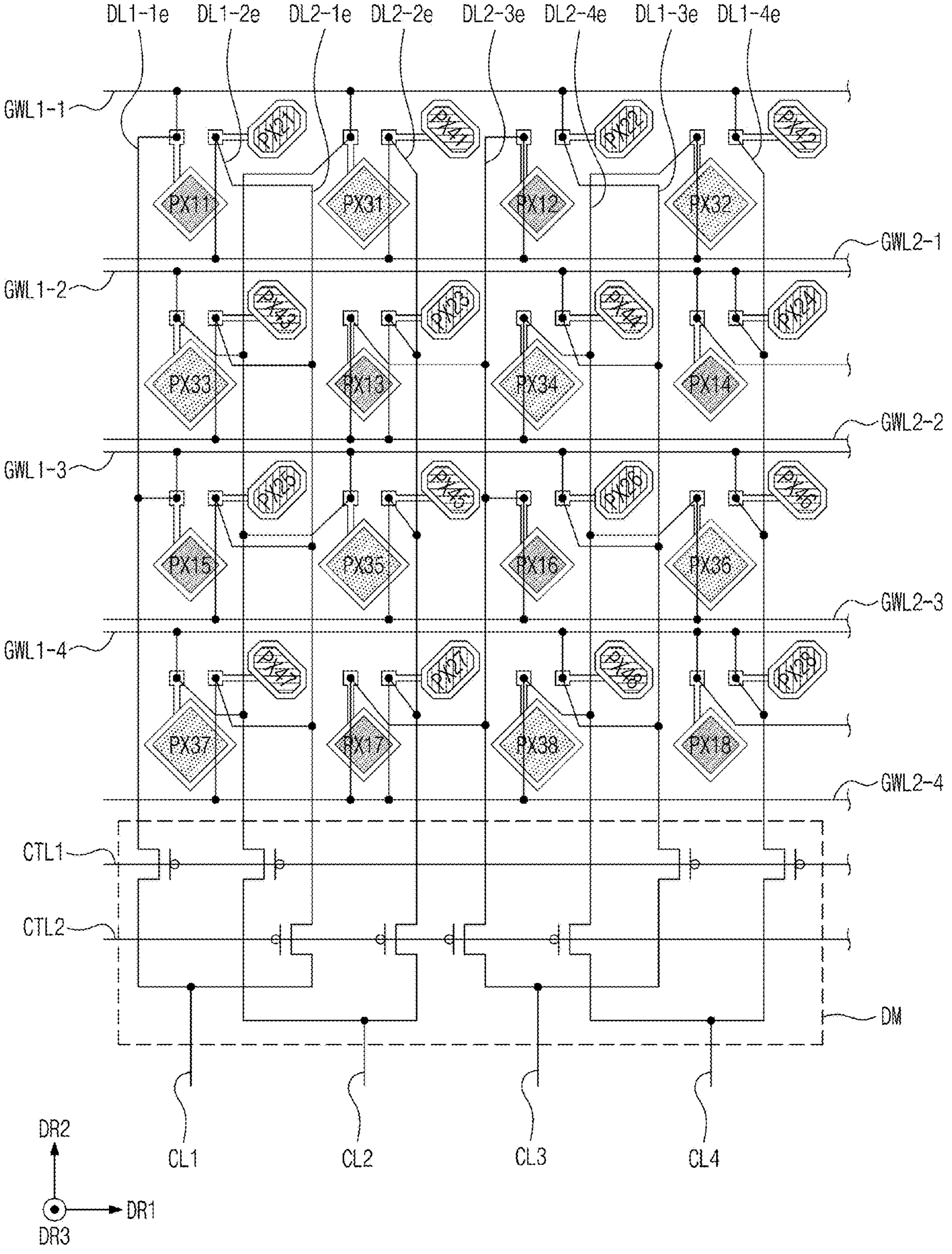
FIG. 19 is a view illustrating a portion of the display device according to an embodiment of the present disclosure.
Figure 20A:
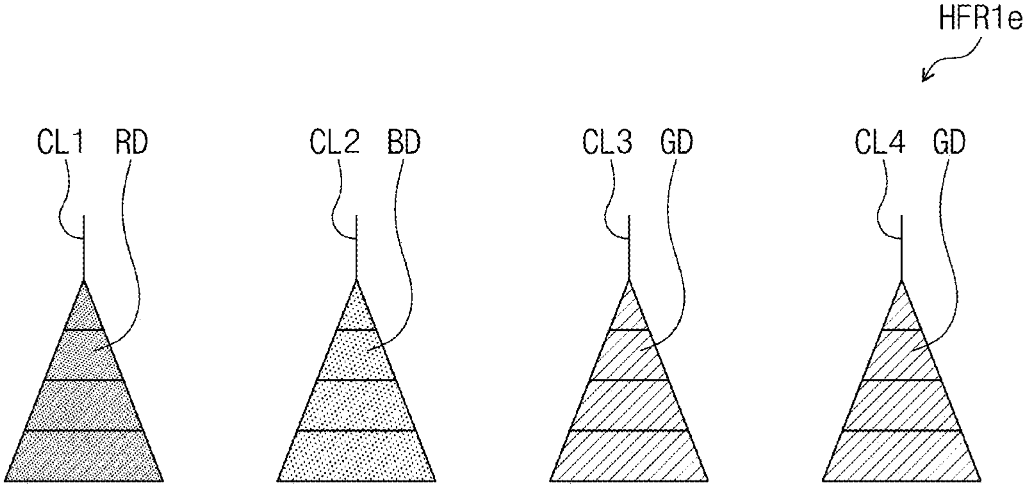
FIG. 20A is a view for an operation of the display device according to an embodiment of the present disclosure.
Figure 20B:
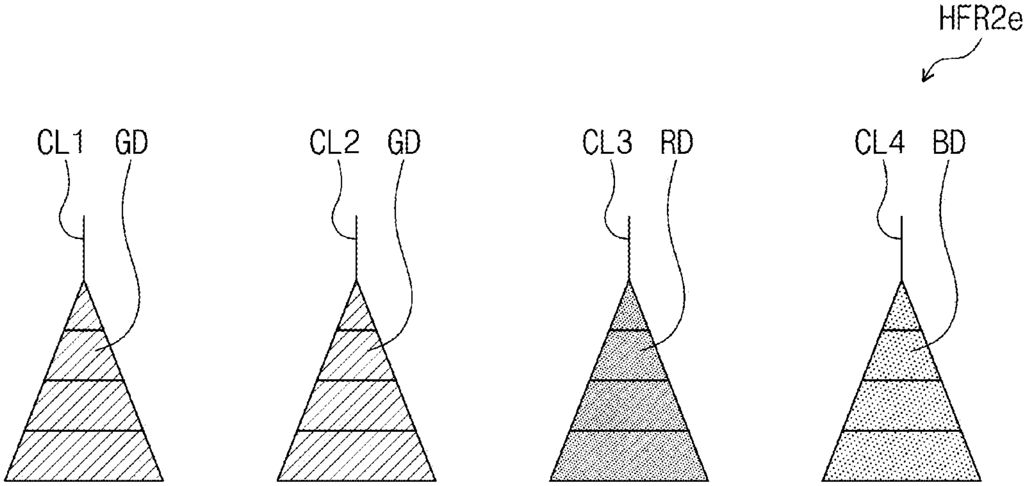
FIG. 20B is a view for an operation of the display device according to an embodiment of the present disclosure.

FIG. 19 is a view illustrating a portion of the display device according to an embodiment of the present disclosure. FIG. 20A is a view for an operation of the display device according to an embodiment of the present disclosure. FIG. 20B is a view for an operation of the display device according to an embodiment of the present disclosure.

Referring to FIG. 19, first group data lines DL1-1*e*, DL1-2*e*, DL1-3*e*, and DL1-4*e* include a first-first group data line DL1-1*e* connected to the first pixels PX11 and PX15, a first-second group data line DL1-2*e* connected to the third pixels PX31, PX33, PX35, and PX37, and first-third group data lines DL1-3*e* and DL1-4*e* connected to the second pixels PX22, PX24, PX26, and PX28 and the fourth pixels PX42, PX44, PX46, and PX48.

In an embodiment of the present disclosure, second group data lines DL2-1*e*, DL2-2*e*, DL2-3*e*, and DL2-4*e* include second-first group data lines DL2-1*e* and DL2-2*e* connected to the second pixels PX21, PX23, PX25, and PX27 and the fourth pixels PX41, PX43, PX45, and PX47, a second-second group data line DL2-3*e* connected to the first pixels PX12, PX13, PX16, and PX17, and a second-third group data line DL2-4*e* connected to the third pixels PX32, PX34, PX36, and PX38.

In an embodiment of the present disclosure, the first-first group data line DL1-1*e*, the first-second group data line DL1-2*e*, the second-first group data line DL2-1*e*, the second-first group data line DL2-2*e*, the second-second group data line DL2-3*e*, the second-third group data line DL2-4*e*, the first-third group data line DL1-3*e*, and the first-third group data line DL1-4*e* are sequentially arranged in the first direction DR1.

Referring to FIGS. 19 and 20A, in a first sub-frame period HFR1*e*, the first to fourth channel lines CL1, CL2, CL3, and CL4 may be electrically connected to the first group data lines DL1-1*e*, DL1-2*e*, DL1-3*e*, and DL1-4*e* through the first control transistors CTR1. A first color data signal RD is sequentially output to the first channel line CL1, a third color data signal BD is sequentially output to the second channel line CL2, and a second color data signal GD is sequentially output to the third and fourth channel lines CL3 and CL4. That is, in the first sub-frame period HFR1*e*, the display device DD (refer to FIG. 4) may display a first sub-image composed of the first color (or, red), the second color (or, green), and the third color (or, blue).

Referring to FIGS. 19 and 20B, in a second sub-frame period HFR2*e*, the first to fourth channel lines CL1, CL2, CL3, and CL4 may be electrically connected to the second group data lines DL2-1*e*, DL2-2*e*, DL2-3*e*, and DL2-4*e* through the second control transistors CTR2. A second color data signal GD is sequentially output to the first and second channel lines CL1 and CL2, a first color data signal RD is sequentially output to the third channel line CL3, and a third color data signal BD is sequentially output to the fourth channel line CL4. That is, in the second sub-frame period HFR2*e*, the display device DD (refer to FIG. 4) may display a second sub-image composed of the first color (or, red), the second color (or, green), and the third color (or, blue).

According to an embodiment of the present disclosure, in each of the first and second sub-frame periods HFR1*e* and HFR2*e*, a data signal provided to pixels having the same color is provided to a single channel line. Accordingly, charging and discharging operations depending on a change in the types of color data signals may be eliminated, and thus the power consumption of the data drive circuit DDC (refer to FIG. 4) may be reduced.

Further, according to an embodiment of the present disclosure, a sub-image composed of the first color (or, red), the second color (or, green), and the third color (or, blue) may be displayed in each of the first and second sub-frame periods HFR1*e* and HFR2*e*. Accordingly, the probability of occurrence of a color break-up phenomenon in which a color difference between the first sub-frame period HFR1*e* and the second sub-frame period HFR2*e* is visible may be reduced or eliminated.

As described above, in each of the sub-frame periods, the channel lines may transfer the data signal to the data lines through the first control transistors, or may transfer the data signal to the data lines through the second control transistors. That is, in one sub-frame period, only the first control transistors may be activated, or only the second control transistors may be activated. In this case, the different types of color data signals output in the one sub-frame period may be reduced. Accordingly, charging and discharging operations depending on a change in the types of color data signals may be reduced or eliminated, and thus the power consumption of the data drive circuit may be reduced.

In addition, in each of the sub-frame periods, a sub-image composed of the first color (or, red), the second color (or, green), and the third color (or, blue) may be displayed. Accordingly, the probability of occurrence of a color break-up phenomenon in which a color difference between the sub-frame periods is visible may be reduced or eliminated.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:

a plurality of data lines arranged in a first direction;

a demultiplexer connected to the plurality of data lines;

a plurality of first gate lines arranged in a second direction;

a plurality of second gate lines arranged in the second direction; and a plurality of pixels, each of which is connected to one corresponding data line among the plurality of data lines and one corresponding gate line among the plurality of first gate lines and the plurality of second gate lines, the plurality of pixels including a first group of pixels and a second group of pixels, wherein the plurality of data lines includes a first group of data lines connected to the first group of pixels and a second group of data lines connected to the second group of pixels, wherein a data signal is provided to the first group of pixels in a first sub-frame period of one frame period, and wherein a data signal is provided to the second group of pixels in a second sub-frame period of the one frame period that is adjacent to the first sub-frame period, wherein the demultiplexer includes a plurality of first control transistors connected to the first group of data lines in a one-to-one correspondence and a plurality of second control transistors connected to the second group of data lines in a one-to-one correspondence, wherein in the first sub-frame period, a first control signal that controls a plurality of first control transistors has activation levels and inactivation levels alternating with one another, and a second control signal that controls a plurality of second control transistors has an inactivation level throughout an entirety of the first sub-frame period, and wherein in the second sub-frame period, the second control signal has activation levels and inactivation levels alternating with one another, and the first control signal has an inactivation level throughout an entirety of the second sub-frame period.

2. The display device of claim 1, wherein the plurality of first gate lines and the plurality of second gate lines alternate with one another in the second direction, wherein the plurality of first gate lines are sequentially activated in the first sub-frame period, and wherein the plurality of second gate lines are sequentially activated in the second sub-frame period.

3. The display device of claim 1, further comprising:

wherein the plurality of first control transistors are configured to be controlled by the first control signal provided through a first control line, and wherein the plurality of second control transistors are configured to be controlled by a second control signal provided through the second control line.

4. The display device of claim 1, wherein the plurality of pixels includes a first pixel configured to output light having a first color, a second pixel configured to output light having a second color different from the first color, a third pixel configured to output light having a third color different from the first color and the second color, and a fourth pixel configured to output light having the second color, wherein the first pixel and the third pixel are alternately arranged one by one in the first direction and the second direction, and wherein the second pixel and the fourth pixel are alternately arranged one by one in the first direction and the second direction.

5. The display device of claim 4, wherein the first group of pixels include the first pixel and the third pixel, and wherein the second group of pixels include the second pixel and the fourth pixel.

6. The display device of claim 5, wherein each of the first pixel and the third pixel is electrically connected to a corresponding first gate line among the plurality of first gate lines, and wherein each of the second pixel and the fourth pixel is electrically connected to a corresponding second gate line among the plurality of second gate lines.

7. The display device of claim 5, wherein the first group of data lines is connected to the first pixel and the third pixel, respectively, and the second group of data lines is connected to the second pixel and the fourth pixel, respectively, and wherein the first group of data lines and the second group of data lines alternate with one another.

8. The display device of claim 5, wherein the first group of data lines includes a first-first group data line connected to the first pixel and a first-second group data line connected to the third pixel, wherein the second group of data lines is connected to the second pixel and the fourth pixel, respectively, and wherein the first-first group data line, one of the second group of data lines, the first-second group data line, and another one of the second group of data lines are sequentially arranged.

9. The display device of claim 4, wherein the first group of data lines includes a first-first group data line connected to the first pixel and the third pixel and a first-second group data line connected to the second pixel and the fourth pixel, wherein the second group of data lines includes a second-first group data line connected to the second pixel and the fourth pixel and a second-second group data line connected to the first pixel and the third pixel, and wherein the first-first group data line, the second-first group data line, the second-second group data line, and the first-second group data line are sequentially arranged.

10. The display device of claim 4, wherein the first group of data lines includes a first-first group data line connected to the first pixel, a first-second group data line connected to the second pixel and the fourth pixel, and a first-third group data line connected to the third pixel, wherein the second group of data lines includes a second-first group data line connected to the third pixel, a second-second group data line connected to the second pixel and the fourth pixel, and a second-third group data line connected to the first pixel, and wherein the first-first group data line, the second-first group data line, the first-second group data line, the second-second group data line, the second-third group data line, the first-third group data line, the second-second group data line, and the first-second group data line are sequentially arranged.

11. The display device of claim 4, wherein the first group of data lines includes a first-first group data line connected to the first pixel, a first-second group data line connected to the third pixel, and a first-third group data line connected to the second pixel and the fourth pixel, wherein the second group of data lines includes a second-first group data line connected to the second pixel and the fourth pixel, a second-second group data line connected to the first pixel, and a second-third group data line connected to the third pixel, and wherein the first-first group data line, the second-first group data line, the first-second group data line, the second-first group data line, the second-second group data line, the first-third group data line, the second-third group data line, and the first-third group data line are sequentially arranged.

12. The display device of claim 4, wherein the first group of data lines includes a first-first group data line connected to the first pixel, a first-second group data line connected to the third pixel, and a first-third group data line connected to the second pixel and the fourth pixel, wherein the second group of data lines includes a second-first group data line connected to the second pixel and the fourth pixel, a second-second group data line connected to the first pixel, and a second-third group data line connected to the third pixel, and wherein the first-first group data line, the first-second group data line, the second-first group data line, the second-first group data line, the second-second group data line, the second-third group data line, the first-third group data line, and the first-third group data line are sequentially arranged.

13. The display device of claim 4, wherein the first pixel and the third pixel are configured to emit light in the first sub-frame period, and the second pixel and the fourth pixel are configured to emit light in the second sub-frame period.

14. The display device of claim 4, wherein the first pixel, the second pixel, the third pixel, and the fourth pixel are configured to emit light in the first sub-frame period and the second sub-frame period.

15. A display device comprising:

a plurality of first data lines arranged in a first direction;

a plurality of second data lines arranged in the first direction;

a plurality of gate lines arranged in a second direction;

a plurality of first pixels electrically connected to the plurality of first data lines and the plurality of gate lines;

a plurality of second pixels electrically connected to the plurality of second data lines and the plurality of gate lines; and a demultiplexer including a plurality of first control transistors connected to the plurality of first data lines in a one-to-one correspondence and a plurality of second control transistors connected to the plurality of second data lines in a one-to-one correspondence, wherein in a first sub-frame period of one frame period, a first control signal to control the plurality of first control transistors has activations levels and inactivation levels alternating with one another, and a second control signal to control the plurality of second control transistors has an inactivation level throughout an entirety of the first sub-frame period, and wherein in a second sub-frame period of the one frame period that is adjacent to the first sub-frame period, the second control signal has activation levels and inactivation levels alternating with one another, and the first control signal has an inactivation level throughout an entirety of the second sub-frame period.

16. The display device of claim 15, wherein the plurality of gate lines includes a plurality of first gate lines electrically connected to the plurality of first pixels and a plurality of second gate lines electrically connected to the plurality of second pixels, and wherein the plurality of first gate lines are sequentially activated in the first sub-frame period, and wherein the plurality of second gate lines are sequentially activated in the second sub-frame period.

17. The display device of claim 16, wherein the plurality of first pixels and the plurality of second pixels include a first pixel configured to output light having a first color, a second pixel configured to output light having a second color different from the first color, a third pixel configured to output light having a third color different from the first color and the second color, and a fourth pixel configured to output light having the second color, and wherein the first to fourth pixels are configured to emit light in the one frame period.

18. The display device of claim 17, wherein the first pixel and the third pixel are configured to emit light in the first sub-frame period, and the second pixel and the fourth pixel are configured to emit light in the second sub-frame period, and wherein the first pixel, the second pixel, the third pixel, and the fourth pixel are configured to emit light in the first sub-frame period and the second sub-frame period.

19. An electronic device comprising:

a display device comprising:

a plurality of data lines arranged in a first direction;

a plurality of gate lines arranged in a second direction;

a plurality of pixels electrically connected to the plurality of data lines and the plurality of gate lines;

a plurality of first control transistors connected to some of the plurality of data lines in a one-to-one correspondence; and a plurality of second control transistors connected to the other data lines among the plurality of data lines in a one-to-one correspondence, wherein a data signal is provided only to the some data lines connected to the plurality of first control transistors in a first sub-frame period of one frame period, and wherein a data signal is provided only to the other data lines connected to the plurality of second control transistors in a second sub-frame period of the one frame period that is adjacent to the first sub-frame period, wherein in the first sub-frame period, a first control signal that controls the plurality of first control transistors has activation levels and inactivation levels alternating with one another, and a second control signal that controls the plurality of second control transistors has an inactivation level throughout an entirety of the first sub-frame period, and wherein in the second sub-frame period, the second control signal has activation levels and inactivation levels alternating with one another, and the first control signal has an inactivation level throughout an entirety of the second sub-frame period.

* * * * *